US012705476B2

(12) United States Patent
Basani et al.

(10) Patent No.: US 12,705,476 B2
(45) Date of Patent: Aug. 11, 2026

(54) ALL-PHOTONIC ARTIFICIAL NEURAL NETWORK PROCESSOR VIA NONLINEAR OPTICS

(71) Applicant: Massachusetts Institute of Technology, Cambridge, MA (US)

(72) Inventors: Jasvith Raj Basani, College Park, MD (US); Mikkel Heuck, Somerville, MA (US); Dirk Robert Englund, Brookline, MA (US); Stefan Ivanov Krastanov, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 747 days.

(21) Appl. No.: 18/310,697

(22) Filed: May 2, 2023

(65) Prior Publication Data

US 2023/0351168 A1 Nov. 2, 2023

Related U.S. Application Data

(60) Provisional application No. 63/337,415, filed on May 2, 2022.

(51) Int. Cl.
*G02F 1/365* (2006.01)
*G02F 1/35* (2006.01)
(Continued)

(52) U.S. Cl.
CPC ........... *G06N 3/067* (2013.01); *G02F 1/3515* (2013.01); *G02F 1/3536* (2013.01); *G02F 1/365* (2013.01); *G06N 3/048* (2023.01)

(58) Field of Classification Search
CPC ...... G02F 1/3515; G02F 1/3536; G02F 1/365; G06N 3/048; G06N 3/067
(Continued)

(56) References Cited

U.S. PATENT DOCUMENTS

2014/0193155 A1* 7/2014 Popovic .............. H04J 14/0307 29/428
2019/0312402 A1* 10/2019 Lucas ..................... H01S 3/005
(Continued)

FOREIGN PATENT DOCUMENTS

CN 113673677 A 11/2021
CN 113961035 A 1/2022
(Continued)

OTHER PUBLICATIONS

"Conversion Efficiency in Kerr-Microresonator Optical Parametric Oscillators: From Three Modes to Many Modes" by Stone et al, Phys. Rev. Applied 17, 024038, Feb. 14, 2022.*
(Continued)

*Primary Examiner* — Robert Tavlykaev
(74) *Attorney, Agent, or Firm* — Smith Baluch LLP

(57) ABSTRACT

An all-photonic computational accelerator encodes information in the amplitudes of frequency modes stored in a ring resonator. Nonlinear optical processes enable interaction among these modes. Both the matrix multiplication and element-wise activation functions on these modes (the artificial neurons) occur through coherent processes, enabling the representation of negative and complex numbers without digital electronics. This accelerator has a lower hardware footprint than electronic and optical accelerators, as the matrix multiplication happens in a single multimode resonator on chip. Our architecture provides a unitary, reversible mode of computation, enabling on-chip analog Hamiltonian-echo backpropagation for gradient descent and other self-learning tasks. Moreover, the computational speed increases with the power of the pumps to arbitrarily high rates, as long as the circuitry can sustain the higher optical power.

20 Claims, 10 Drawing Sheets

(51) Int. Cl.
*G06N 3/048* (2023.01)
*G06N 3/067* (2006.01)

(58) Field of Classification Search
USPC .................................................. 385/5, 14, 30
See application file for complete search history.

(56) References Cited

U.S. PATENT DOCUMENTS

| | | | | |
|---|---|---|---|---|
| 2020/0348579 | A1* | 11/2020 | Heuck | G02F 3/00 |
| 2020/0372334 | A1 | 11/2020 | Carolan et al. | |
| 2021/0264241 | A1 | 8/2021 | Karanth et al. | |
| 2021/0357737 | A1* | 11/2021 | Hamerly | G06N 3/067 |
| 2022/0229345 | A1* | 7/2022 | Yurash | G02F 1/365 |

FOREIGN PATENT DOCUMENTS

| | | | |
|---|---|---|---|
| CN | 111563583 | B | 8/2022 |
| CN | 115202127 | A | 10/2022 |
| WO | 2021211793 | A1 | 10/2021 |
| WO | 2022016894 | A1 | 1/2022 |
| WO | 2022016918 | A1 | 1/2022 |
| WO | 2022084063 | A1 | 4/2022 |
| WO | 2023285636 | A1 | 1/2023 |
| WO | 2023012640 | A1 | 2/2023 |
| WO | 2023028686 | A1 | 3/2023 |

OTHER PUBLICATIONS

"Coupled-mode theory for microresonators with quadratic nonlinearity" by Skryabin, Journal of the Optical Society of America B, vol. 37, No. 9, pp. 2604-2614 (Year: 2020).*

Almeida et al. "All-optical control of light on a silicon chip." Nature 431.7012 (2004): 1081-1084.

Amin et al. "ITO-based electro-absorption modulator for photonic neural activation function." APL Materials 7.8 (2019), 12 pages.

APS Bulletin 2022 re All-Photonic Artificial Neural Network Processor Via Non-linear Optics Mar. 14-18, 2022, Chicago 1 page.

Basani et al. "All-Photonic Artificial Neural Network Processor Via Non-linear Optics." arXiv preprint arXiv:2205.08608 (2022), 16 pages.

Basani et al., "All-Photonic Artificial Neural Network Processor Via Nonlinear Optics," in Conference on Lasers and Electro-Optics, (CLEO) Technical Digest Series (Optica Publishing Group, 2022), paper SF4F.5, 2 pages.

Bergfeld et al. "Second-Harmonic Generation in GaAs: Experiment versus Theoretical Predictions of $_X$ x y z (2)." Physical Review Letters 90.3 (2003): 036801, 4 pages.

Borghi et al "Four wave mixing control in a photonic molecule made by silicon microring resonators." Scientific Reports 9.1 (2019): 408, 14 pages.

Cappellini et al. "Third-order three-wave mixing in single-mode fibers: exact solutions and spatial instability effects." JOSA B 8.4 (1991): 824-838, 15 pages.

Chang et al. "Metalens-enabled low-power solid-state 2D beam steering." CLEO: Science and Innovations. Optica Publishing Group, 2019, 2 pages.

Chen et al. "Diannao: A small-footprint high-throughput accelerator for ubiquitous machine-learning." ACM SIGARCH Computer Architecture News 42.1 (2014): 269-284.

Cheng et al. "In-plane optical absorption and free carrier absorption in graphene-on-silicon waveguides." IEEE Journal of Selected Topics in Quantum Electronics 20.1 (2013): 43-48.

Dejonckheere et al. "All-optical reservoir computer based on saturation of absorption." Optics Express 22.9 (2014): 10868-10881, 14 pages.

Deng "The mnist database of handwritten digit images for machine learning research [best of the web]." IEEE Signal Processing Magazine 29.6 (2012): 141-142.

Esser et al. "Convolutional networks for fast, energy-efficient neuromorphic computing." Proc. Natl. Acad. Sci. USA 27 (2016): 201604850, 6 pages.

Fard et al. "Experimental realization of arbitrary activation functions for optical neural networks." Optics Express 28.8 (2020): 12138-12148, 11 pages.

Fisher "The use of multiple measurements in taxonomic problems." Annals of Eugenics 7.2 (1936): 179-188, 11 pages.

Fu et al. "Programmable low-power consumption all-optical nonlinear activation functions using a micro-ring resonator with phase-change materials." Optics Express 30.25 (2022): 44943-44953.

George et al. "Electrooptic nonlinear activation functions for vector matrix multiplications in optical neural networks." Signal Processing in Photonic Communications. Optica Publishing Group, 2018, 2 pages.

Graves et al. "Hybrid computing using a neural network with dynamic external memory." Nature 538.7626 (2016): 471-476, 21 pages.

Green et al. "Hybrid InGaAsP—InP Mach-Zehnder racetrack resonator for thermooptic switching and coupling control." Optics Express 13.5 (2005): 1651-1659, 9 pages.

Guo et al. "Backpropagation through nonlinear units for all-optical training of neural networks." arXiv preprint arXiv: 1912.12256 (2019), 15 pages.

Guo et al. "Nonlinear transformation of complex amplitudes via quantum singular value transformation." arXiv preprint arXiv:2107.10764 (2021), 10 pages.

Hazan et al. "MXene Nanoflakes Enabled All-Optical Nonlinear Activation Function for On-Chip Photonic Deep Neural Networks." Advanced Materials (2023): 2210216, 12 pages.

Heuck et al. "Unidirectional frequency conversion in microring resonators for on-chip frequency-multiplexed single-photon sources," New J. of Phys., 21, 033037, (2019), 20 pages.

Heuck, et al. "Improved switching using Fano resonances in photonic crystal structures." Optics Letters 38.14 (2013): 2466-2468, 4 pages.

Hill et al. "All fiber-optic neural network using coupled SOA based ring lasers." IEEE Transactions on Neural Networks 13.6 (2002): 1504-1513, 11 pages.

Hornik et al. "Multilayer feedforward networks are universal approximators." Neural Networks 2.5 (1989): 359-366.

Huang et al. "Silicon photonic-electronic neural network for fibre nonlinearity compensation." arXiv e-prints (2021): arXiv-2110, 29 pages.

Jha et al. "Reconfigurable all-optical nonlinear activation functions for neuromorphic photonics." Optics Letters 45.17 (2020): 4819-4822, 4 pages.

Ji et al. "Ultra-low-loss on-chip resonators with sub-milliwatt parametric oscillation threshold." Optica 4.6 (2017): 619-624.

Kiani et al. "Four-wave mixing in high-Q tellurium-oxide-coated silicon nitride microring resonators." OSA Continuum 3.12 (2020): 3497-3507, 11 pages.

Kibria et al. "All optical signal-processing techniques utilizing four wave mixing." Photonics. vol. 2. No. 1. MDPI, 2015, 14 pages.

Kingma et al. "Adam: A method for stochastic optimization." arXiv preprint arXiv:1412.6980 (2014), 15 pages.

Kristensen et al. "On the theory of coupled modes in optical cavity-waveguide structures." Journal of Lightwave Technology 35.19 (2017): 4247-4259.

Leuthold et al. "Nonlinear silicon photonics." Nature Photonics 4.8 (2010): 535-544.

Lin et al. "All-optical machine learning using diffractive deep neural networks." Science 361.6406 (2018): 1004-1008.

Liu et al. "High-yield, wafer-scale fabrication of ultralow-loss, dispersion-engineered silicon nitride photonic circuits." Nature Communications 12.1 (2021): 2236, 9 pages.

Madsen et al., "Integrated all-pass filters for tunable dispersion and dispersion slope compensation," in IEEE Photonics Technology Letters, vol. 11, No. 12, pp. 1623-1625, Dec. 1999, doi: 10.1109/68.806867, 3 pages.

Mendoza-Yero et al. "Encoding complex fields by using a phase-only optical element." Optics Letters 39.7 (2014): 1740-1743.

(56) References Cited

OTHER PUBLICATIONS

Miscuglio et al. "All-optical nonlinear activation function for photonic neural networks." Optical Materials Express 8.12 (2018): 3851-3863, 13 pages.
Mos et al. "Optical-mode neural network by use of the nonlinear response of a laser diode to external optical feedback." Applied Optics 36.26 (1997): 6654-6663.
Mourgias-Alexandris et al. "An all-optical neuron with sigmoid activation function." Optics Express 27.7 (2019): 9620-9630, 11 pages.
Nahmias et al. "An integrated analog O/E/O link for multi-channel laser neurons." Applied Physics Letters 108.15 (2016), 6 pages.
Nurdin et al. "Perfectly capturing traveling single photons of arbitrary temporal wavepackets with a single tunable device." arXiv preprint arXiv:1609.05643 (2016), 15 pages.
Puckett et al. "Observation of second-harmonic generation in silicon nitride waveguides through bulk nonlinearities." Optics Express 24.15 (2016): 16923-16933.
Queseda et al. "Why you should not use the electric field to quantize in nonlinear optics." Optics Letters 42.17 (2017): 3443-3446.
Rasmussen et al. "All-optical non-linear activation function for neuromorphic photonic computing using semiconductor Fano lasers." Optics Letters 45.14 (2020): 3844-3847.
Risk et al. Compact blue-green lasers. Cambridge University Press, 2003, 28 pages.
Rosenbluth et al. "A high performance photonic pulse processing device." Optics Express 17.25 (2009): 22767-22772, 6 pages.
Schrittwieser et al. "Mastering atari, go, chess and shogi by planning with a learned model." Nature 588.7839 (2020): 604-609.
Senior et al. "Improved protein structure prediction using potentials from deep learning." Nature 577.7792 (2020): 706-710, 22 pages.
Shaw "Nonlinear spatio-temporal theory of the doubly resonant degenerate optical parametric oscillator." Solid State Lasers and Nonlinear Crystals. vol. 2379. SPIE, 1995, 14 pages.
Shen et al. "Deep learning with coherent nanophotonic circuits." Nature Photonics 11.7 (2017): 441-446.
Shi et al. "WDM weighted sum in an 8×8 SOA-Based InP cross-connect for photonic deep neural networks." 2018 Photonics in switching and computing (PSC). IEEE, 2018, pp. 1-3.
Spall et al. "Fully reconfigurable coherent optical vector-matrix multiplication." arXiv preprint arXiv:2009.12095 (2020), 5 pages.
Steinkraus et al. "Using GPUs for machine learning algorithms In: Eighth International Conference on Document Analysis and Recognition (ICDAR'05)." (2005): 1115-1120.
Suh et al. "Temporal coupled-mode theory and the presence of non-orthogonal modes in lossless multimode cavities." IEEE Journal of Quantum Electronics 40.10 (2004): 1511-1518.
Sze et al. "Efficient processing of deep neural networks: A tutorial and survey." Proceedings of the IEEE 105.12 (2017): 2295-2329.
Tait et al. "Broadcast and Weight: An Integrated Network For Scalable Photonic Spike Processing." Journal of Lightwave Technology 32.21 (2014) 13 pages.
Tait et al. "Neuromorphic photonic networks using silicon photonic weight banks." Scientific Reports 7.1, 7430, (2017): 10 pages.
Tait et al. "Silicon photonic modulator neuron." Physical Review Applied 11.6 (2019): 064043, 18 pages.
Upham et al. "Time-resolved catch and release of an optical pulse from a dynamic photonic crystal nanocavity." Optics Express 19.23 (2011): 23377-23385.
Vandoorne et al. "Toward optical signal processing using photonic reservoir computing." Optics Express 16.15 (2008): 11182-11192.
Vivien et al. "Zero-bias 40Gbit/s germanium waveguide photodetector on silicon." Optics Express 20.2 (2012): 1096-1101.
Williamson et al. "Reprogrammable electro-optic nonlinear activation functions for optical neural networks." IEEE Journal of Selected Topics in Quantum Electronics 26.1 (2019): 1-12.
Wright et al. "Nonlinear multimode photonics: nonlinear optics with many degrees of freedom." Optica 9.7 (2022): 824-841.
Wright et al. "Physics of highly multimode nonlinear optical systems." Nature Physics 18.9 (2022): 1018-1030, 13 pages.
Xu et al. "Reconfigurable nonlinear photonic activation function for photonic neural network based on non-volatile opto-resistive RAM switch." Light: Science & Applications 11.1 (2022): 288, 11 pages.
Yan et al. "$_{\chi}$ 2-based AlGaAs phase sensitive amplifier with record gain, noise, and sensitivity." Optica 9.1 (2022): 56-60.
Yariv "Critical coupling and its control in optical waveguide-ring resonator systems." IEEE Photonics Technology Letters 14.4 (2002): 483-485, 3 pages.
Young et al. "Recent trends in deep learning based natural language processing." IEEE Computational Intelligence Magazine 13.3 (2018): 55-75, 21 pages.
Zelmon et al. "Infrared corrected Sellmeier coefficients for congruently grown lithium niobate and 5 mol.% magnesium oxide-doped lithium niobate." JOSA B 14.12 (1997): 3319-3322, 4 pages.
Zhang et al. "An optical neural chip for implementing complex-valued neural network." Nature Communications 12.1 (2021): 457, 11 pages.
Zhao et al. "All-optical switching via four-wave mixing Bragg scattering in a silicon platform." arXiv preprint arXiv:1611.03937 (2016), 7 pages.
Zhou et al. "Photonic matrix multiplication lights up photonic accelerator and beyond." Light: Science & Applications 11.1 (2022): 30, 21 pages.
Zuo et al. "All Optical Neural Network with Nonlinear Activation Functions." arXiv preprint arXiv:1904.10819 (2019), 6 pages.
Zuo et al. "All-optical neural network with nonlinear activation functions." Optica 6.9 (2019): 1132-1137.

* cited by examiner

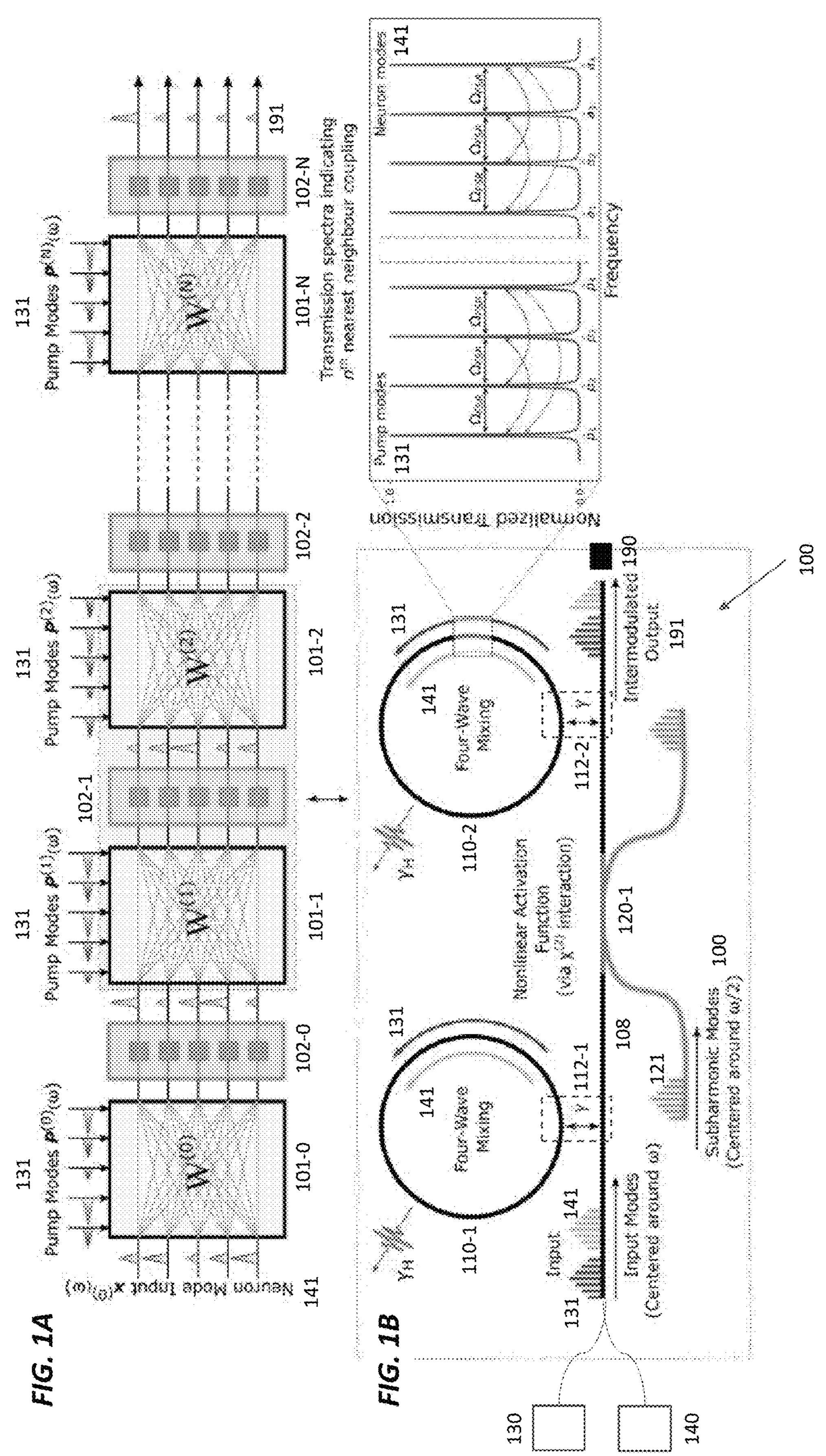
FIG. 1A
Neuron Mode Input x(0)(ω)
141
131
Pump Modes p(0)(ω)
W(0)
101-0
102-0
131
Pump Modes p(1)(ω)
W(1)
101-1
102-1
131
Pump Modes p(2)(ω)
W(2)
101-2
102-2
131
Pump Modes p(N)(ω)
W(N)
101-N
102-N
191
Transmission spectra indicating
nth nearest neighbour coupling
FIG. 1B
130
140
131
Input
141
Input Modes
(Centered around ω)
γH
110-1
141
Four-Wave
Mixing
131
112-1
γ
108
121
Subharmonic Modes
(Centered around ω/2)
100
Nonlinear Activation
Function
(via χ(2) interaction)
120-1
γH
110-2
141
Four-Wave
Mixing
131
112-2
γ
Intermediated
Output
191
190
100
Normalized Transmission
131
Pump modes
Neuron modes
141
Frequency

ALL-PHOTONIC ARTIFICIAL NEURAL NETWORK PROCESSOR VIA NONLINEAR OPTICS

CROSS-REFERENCE TO RELATED APPLICATION(S)

This application claims the priority benefit, under 35 U.S.C. 119(e), of U.S. Application No. 63/337,415, filed May 2, 2022, which is incorporated herein by reference in its entirety for all purposes.

BACKGROUND

The last decade has witnessed phenomenal advances in the domain of machine learning, with applications ranging from natural language processing, structural biology and even game playing. With the growing accessibility of large datasets and larger computational power, machine learning models have been increasing in complexity to tackle a multitude of problems. The desire for better performance in these networks has led to the development of hardware accelerators, specifically for the training of deep neural networks. Recently, tailored digital electronic architectures, such as Graphic Processing Units (GPUs) and application-specific integrated circuits such as Google's Tensor Processing Units, IBM TrueNorth, and Intel Nervana, have been introduced to accelerate the training and inference of machine learning models. These devices still do, however, use enormous energy resources and can be uneconomical at tackling problems with large computational complexity.

Recently, with advances in silicon photonics, optical computing has been introduced as an attractive platform to carry out large-scale computational schemes. Properties of light, such as coherence and superposition, blended with the vast array of CMOS-compatible optical devices has made photonics a fruitful direction of exploration for efficiently and effectively implementing computational schemes.

Photonic implementations of neural networks have been proposed and successfully realized in free-space environments using spatial light modulators (SLMs), vertical cavity surface emitting laser (VCSEL) arrays, diffractive media, and homodyne detection. A number of techniques have been used to construct optical neural networks via photonic integrated circuitry, particularly with interferometric meshes, electro-optics, and time-wavelength multiplexing. These architectures have been exploited to build scalable devices for spiking neural networks and reservoir computing. The photonic platform has garnered interest from scientists and engineers alike, to leverage the massive parallelism being offered by the multiple degrees of freedom of light (wavelength, polarization, phase, etc.).

A problem faced by even the most optimized electronic architectures is the expenditure of energy for data movement as opposed to logical operations. Photonic solutions, on the other hand, operate with greatly reduced energy consumption, both in terms of data-transfer operations and computational operations, by performing linear (and some nonlinear) transformations via passive optical interactions. Moreover, linear matrix transformations have been recorded at rates exceeding 100 GHz. Advances in nanophotonics have allowed implementation of bulk optical nonlinearities enabling very fast frequency conversion.

SUMMARY

The construction of neural networks comprises two fundamental components—linear matrix multiplication to serve as an interconnect between consecutive layers, followed by a nonlinear (e.g., sigmoid) activation function. Here, we disclose an architecture for a fully photonic implementation of artificial neural networks based on nonlinear optical intermodulation. In contrast to other approaches, this optical neural network encodes information in the complex amplitudes of frequency states, or modes, that act as neurons, in a multimode cavity. Furthermore, information regarding the linear transformations that these neuron modes undergo is encoded in the amplitudes of controlled pump modes. General matrix-vector and matrix-matrix multiplications are enabled via Four-Wave Mixing (FWM). This approach can represent negative (or even complex) activation values, a problem plaguing other optical approaches.

Unlike other optical and opto-electronic approaches, our optical neural network performs the elementwise nonlinear activation function coherently via a nonlinear optical process. Our nonlinear activation function can represent activation functions acting on negative and even complex numbers, without passing through a detector and electronic digital computer.

Examples of our optical neural network can be made rapidly re-programmable as well. It can be realized on microring resonators, allowing easy fabrication, via well-established lithography techniques. Moreover, the entire computation performed by the optical neural network is, in principle, reversible and unitary, opening up many possibilities for low-power (even reversible) computation, and on-chip efficient analog Hamiltonian-echo backpropagation for gradient descent and other self-learning tasks. The rate at which the optical neural network performs matrix-multiplication operations scales with the pump power, hence providing for extremely fast operations, as long as the circuitry can tolerate high-power control pulses.

An inventive optical neural network can include a multimode optical cavity, a pump source in optical communication with the multimode optical cavity, and a nonlinear optical medium (e.g., a second-order nonlinear medium) in optical communication with the multimode optical cavity. In operation, the multimode optical cavity supports optical neuron modes representing respective neurons in a layer of the optical neural network. The pump source couples pump modes into the multimode optical cavity. These pump modes encode respective weights of the layer of the optical neural network. The optical neuron modes undergo a linear transformation via a nonlinear mixing process (e.g., a four-wave mixing process) with the pump modes in the multimode optical cavity. And the nonlinear optical medium performs a nonlinear transformation on an output of the multimode optical cavity, e.g., a second-order nonlinear interaction between the optical neuron modes and subharmonic pump modes.

The multimode optical cavity can be implemented as a multimode ring resonator formed at least in part of a third-order nonlinear medium. The multimode optical cavity can be one of a series of cascaded multimode optical cavities.

The optical neural network may also include a tunable coupler, in optical communication with the multimode optical cavity, to selectively couple the optical neuron modes into and out of the multimode optical cavity. And it may include a dispersive waveguide segment, in optical communication with an input to the nonlinear optical medium, to temporally disperse the optical neuron modes before the nonlinear transformation, in which case it can include a dispersion-compensating waveguide segment, in optical communication with an output of the nonlinear optical medium, to temporally align the optical neuron modes after the nonlinear transformation.

An inventive method of implementing an optical neural network includes coupling optical neuron modes with complex amplitudes representing respective inputs to a layer of the optical neural network into a multimode optical cavity. Pump modes representing weights of the layer of the optical neural network are also coupled into the multimode optical cavity. The pump modes mediate a linear transformation of the optical neuron modes in the multimode optical cavity via a nonlinear mixing process (e.g., a four-wave mixing process). The linear transformation may preserve temporal envelopes of the optical neuron modes. The optical neuron modes are coupled from the multimode optical cavity to a nonlinear optical medium, where they are nonlinearly transformed (e.g., an elementwise sigmoid transformation) to produce outputs of the layer of the optical neural network.

Coupling the optical neuron modes into and/or out of the multimode optical cavity may include tuning a coupling coefficient between an optical waveguide guiding the optical neuron modes and the multimode optical cavity.

Nonlinearly transforming the optical neuron modes may also include coupling subharmonic modes into the nonlinear optical medium with the optical neuron modes so as to initiate a second-order nonlinear interaction between the optical neuron modes and the subharmonic modes. The optical neuron modes can be temporally dispersed before being nonlinearly transformed and temporally aligned after being nonlinearly transformed.

An inventive optical neural network can also include a plurality of neural network layers, each of which includes a multimode microring resonator, a second-order nonlinear medium in optical communication with the multimode microring resonator, and an optional tunable coupler in optical communication with the multimode microring resonator. The multimode microring resonator supports optical pump modes representing weights of the neural network layer and optical neurons modes having complex amplitudes representing respective neurons of the neural network layer. The multimode microring resonator includes a third-order nonlinear medium that supports four-wave mixing of the optical pump modes with the optical neurons modes. A dispersive waveguide segment, in optical communication with the multimode microring resonator, temporally disperses an output of the multimode microring resonator. The second-order nonlinear medium supports an elementwise nonlinear transformation of the (temporally dispersed) output of the multimode microring resonator. And the optional tunable coupler selectively couples the optical neuron modes into and out of the multimode microring resonator.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A is a schematic of an optical neural network with N layers.

FIG. 1B illustrates microring resonators coupled to a bus waveguide with an embedded nonlinearity for implementation of two successive layers of the optical neural network of FIG. 1A and a sample of the spectrum illustrating pump and neuron modes and how they can be coupled (with the double-headed arrows).

DETAILED DESCRIPTION

Figure 1C:
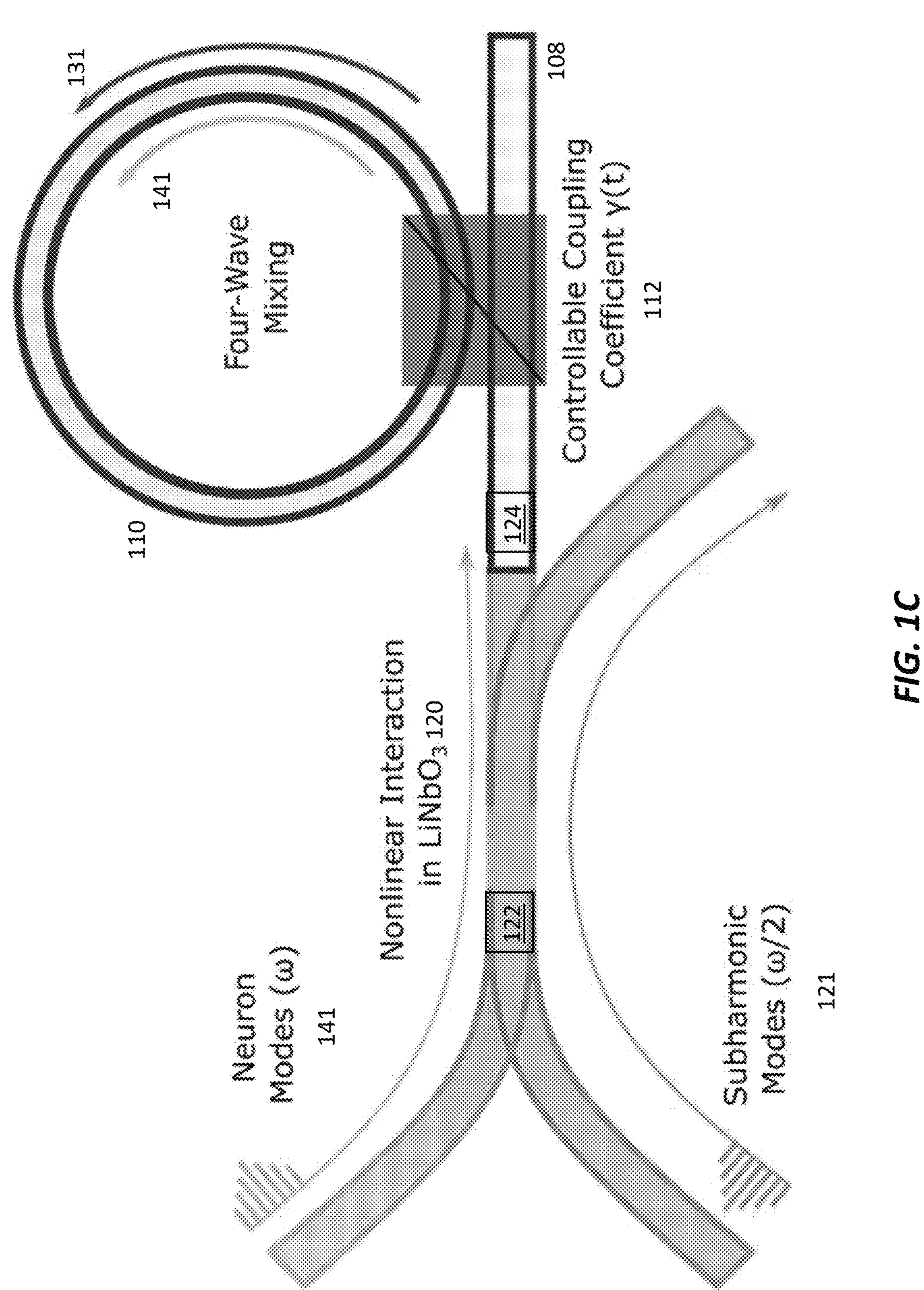
FIG. 1C shows a single layer of the optical neural network of FIG. 1A with a tunable coupler for active coupling.

Here, we disclose an architecture for a coherent, all-optical neural network that relies on coherent nonlinear optical processes. This optical neural network architecture encodes information in the complex amplitudes of frequency states. These frequency states are modulated via four-wave mixing in a $\chi^{(3)}$ medium, enabling matrix multiplication.

Such an optical neural network can be realized experimentally on-chip using microring resonators.

Inventive optical neural networks have multiple advantages over other optical and electronics neural networks. As opposed to digital matrix-vector multiplication, which typically takes $O(N^2)$ timesteps (where N is the size of the vector), an inventive optical neural network has a time complexity of only O(N) due to the parallel nature of the FWM processes. The number of on-chip components is also very low, as all neuron modes occupy the same resonator for each layer of the inventive optical neural network.

An inventive optical neural network can operate at a speed that is directly proportional to the power of the pumps, making it possible to increase the computational speed by simply increasing the pump power. At extreme speeds this leads to increased heating due to leaking from the pumps; however, increases in resonator quality can offset this problem. Furthermore, since a practical device can be trained to accelerate inference on a specific dataset with a single set of weights, the same set of pumps can be recirculated, significantly lowering power requirements, up to the need for amplification to guard against optical losses. With near-term photonic technology, an inventive optical neural network could perform billions of matrix multiplications per second at dissipation rates of roughly tens of milliwatts.

Dedicated retraining is not necessary within an inventive optical neural network. It can implement any unitary matrix. Converting an arbitrary unitary matrix into parametrization in terms of pump amplitudes is a straightforward numerical computation.

In situ, on-chip training or self-learning machines can also be implemented on this hardware as they would unlock even richer dynamics, e.g., by removing simplifying constraints on the pump powers or by exploring the various nonlinear activations functions realized in this optical neural network architecture. Other types of computational accelerators like reservoir computers and Ising machines could also be studied on this hardware.

A particularly exciting benefit of the fully-reversible (unitary) dynamics realized by our accelerator is the possibility of Hamiltonian echo backpropagation, an extremely efficient form of analog gradient descent. Consider a situation in which our optical neural network evaluates the unitary transformation $\vec{A}_{out}=U(\vec{P})\vec{A}_{in}$, where $\vec{A}$ is the input and output neural activation vector and $\vec{P}$ is the pump amplitudes vector. First, prepare a known perturbed output $\vec{A}_{out}+\delta\vec{A}$ that decreases a known cost function C, i.e., $$\epsilon\partial_{\vec{A}}C = -\delta\vec{A}$$

for some step-size ε. This step can be performed by comparing the ground truth with the output of the neural network. Then propagate the perturbed output signal backwards through our optical neural network to generate the perturbed pumps $\vec{P}+\delta\vec{P}$. This perturbed pump leads to a lower cost function when used in the forward inference mode. At this point, we have performed an analog backpropagation gradient descent step. We can then measure $\delta\vec{P}$ in order to record the gradient step or simply repeat the analog gradient descent. The same techniques used for the efficient recirculation and amplification of the pumps can be used here for repeated application of gradient descent.

Programmable Transformations Via Four Wave-Mixing

Deep neural networks (DNNs) are a class of artificial neural networks that, fundamentally, include multiple stacked layers of neurons, each connected via a matrix multiplication ($\vec{x}\mapsto W\vec{x}$) and an element-wise nonlinear activation function ($x_i\mapsto\sigma(x_i)$). For a DNN of arbitrary depth, the input to the $(k+1)^{th}$ layer is related to the input of the $k^{th}$ layer as:

$$x_i^{(k+1)} = \sigma\left(\sum_j W_{i,j}^{(k)} x_j^{(k)}\right)$$

In our optical neural networks, the matrix multiplication by $W^{(k)}$ is realized in a multimode optical cavity. For instance, consider an optical cavity implemented as a microring resonator that supports a frequency comb in the telecommunication range (e.g., at wavelengths around 1550 nm). The frequency states supported by the microring resonator are chosen to be either pump modes or neuron modes that interact with each other via Four-Wave Mixing (FWM). Our optical neural network encodes information to be processed in the complex amplitudes of the neuron modes, while the matrix-multiplication operations are enabled by interaction with controlled pump modes. With FWM being a third-order nonlinear optical process, the microring resonator is fabricated from a material that facilitates the third-order nonlinear optical response described with a large $\chi^{(3)}$ susceptibility coefficient. The neural network weights that act as interconnects between the neural network's layers are encoded in the strength of the pumps.

An Optical Neural Network With Multiple Neuron modes in a Multimode Optical Cavity FIGS. 1A-1C illustrate an optical neural network 100 that performs programmable transformations using FWM between neuron modes and pump modes in multimode optical cavities, shown in FIG. 1B as multimode microring resonators 110-0 through 110-N. Schematically, the optical neural network 100 can be represented as a sequence of N+1 fully connected layers 101-0 through 101-N connected by respective nonlinearities (nonlinear activation functions) 102-0 through 10-N. The optical neural network 100 processes information encoded in the amplitudes of neuron modes 141, i.e., frequency modes, while the linear transformations W(i) are implemented via FWM interactions with strong classical pump modes 131 in the multimode optical cavities. The nonlinear element-wise activation function 102 occurs during propagation through nonlinear regions 120-0 through 120-N of a bus waveguide 108 via nonlinear optical interactions of the neuron modes with additional subharmonic or second-harmonic pump modes 121.

FIG. 1B shows optical hardware for the fully connected layers 101-1 and 101-2 and nonlinear activation function 102-1 in FIG. 1A. This optical hardware includes microring resonators 110-1 and 110-2, which are made from or include material with a large $\chi^{(3)}$ nonlinear coefficient to support FWM between the neuron modes 141 and pump modes 131. These microring resonators 110 can support hundreds to thousands of modes and have free spectral ranges on the order of 10-100 GHz, quality factors (Q-factor) on the order of $10^6$, and loss rates determined by their Q-factors. The speed of the FWM and the powers of the pump modes 131 can be tuned to suit the Q-factor of the resonator 110. Other types of resonators/cavities would work as well, including but not limited to microsphere cavities or photonic crystal cavities as well, so long as their Q-factors are large enough and there is a way to tune the coupling into and out of them.

Suitable materials for the microring resonators 110 include but are not limited to silicon nitride, silicon, silicon dioxide, and aluminum gallium arsenide. The microring resonators 110 are coupled to a bus waveguide 108, which includes a nonlinear region 120-1 made of lithium niobate, gallium arsenide, aluminum gallium arsenide, silicon carbide, or another material with a suitably large $\chi^{(2)}$ nonlinear coefficient between the microring resonators 110 to support the nonlinear activation function. Making the bus waveguide 108 and microring resonators 110 out of a material with high $\chi^{(2)}$ and $\chi^{(3)}$ coefficients (e.g., aluminum gallium arsenide) would allow the entire device to be integrated into a single material platform.

Each microring resonator 110 supports multiple modes, is coupled to the bus waveguide 108 with a coupling coefficient $\gamma(t)$, and experiences internal losses $\gamma_H$. The transmission spectra of the microring resonators 110 is shown at right in FIG. 1B, where the nth nearest neighbor pump and neuron modes are coupled (indicated by the double-headed arrows). The coupling coefficient between the microring resonators 110 and bus waveguide 108 can be fixed and selected so that the neuron modes 141 propagate past the microring resonators 110—the passive coupling case discussed below. For passive coupling, the fixed coupling coefficient should higher that the loss rate. For passive coupling, to ensure full expressivity, each sublayer should have N resonators 110, where N is the number of neuron modes, i.e., the number of resonators scales linearly with the number of neuron modes in the case of passive coupling.

Alternatively, the coupling coefficient can be tunable and selected so that the neuron modes 141 are captured into the microring resonators 110 for the entire FWM process—the active coupling case discussed below. For active coupling, the optical neural network 100 includes one resonator 110 per neural network layer 101 a tunable coupler (e.g., tunable coupler 112-1 and 112-2 in FIG. 1B) between the bus waveguide 108 and each microring resonator 110. Suitable tunable couplers include optical filters like those disclosed in C. K. Madsen et al., "Integrated all-pass filters for tunable dispersion and dispersion slope compensation," in *IEEE Photonics Technology Letters*, vol. 11, no. 12, pp. 1623-1625, December 1999, doi: 10.1109/68.806867, which is incorporated herein by reference in its entirety for all purposes.

The pump modes 131 are generated with a pump source 130, such as a suitably modulated mode-locked laser, that is optically coupled to the bus waveguide 108, with one set of pump modes 131 for each resonator 110 (one set of weights for each neural network layer 101, or NM pump modes 131 for a neural network 100 with N layers 101 and M weights per layer). Similarly, the neuron modes 141 are generated with a neuron mode source 140, such as another suitably modulated mode-locked laser, that is optically coupled to the bus waveguide 108. The pump source 130 and neuron mode source 140 can be coupled to same bus waveguide 108 as shown in FIG. 1B or to separate bus waveguides, on opposite sides of and coupled to the ring resonators 110, in which case both the pump modes 131 and neuron modes 141 may leak into the same (output) bus waveguide. If desired, filters can be used to separate pump modes 131 and neuron modes 141 in the same bus waveguide. In either case, the pump modes 131 and neuron mode 141 can be spaced apart from each other by the free spectral range of the ring resonators 110 as shown at lower right in FIG. 1B and captured in the ring resonators 110 with the controllable coupling.

A photodetector 190 at the output of the bus waveguide 108 detects the intermodulated output modes 191 emitted by the last layer of the optical neural network 100. There are several suitable ways to detect the output modes 191. For example, a dispersive fiber or other dispersive element could separate or disperse the output modes 191 in time, and the photodetector 190 can detect them in time. Alternatively, the photodetector 190 could detect all of the output modes 191 simultaneously, with the output modes 191 encoded in the frequency spectrum of the detected output.

FIG. 1C illustrates the microring resonator 110, tunable coupler 112, and nonlinear region 120 of the bus waveguide 108 in greater detail. The neuron modes 141 and subharmonic (or second-harmonic) modes 121 from an external source undergo a second-order nonlinear interaction in the nonlinear region 120—the nonlinear activation function (nonlinearity). To avoid interactions between different neuron modes 141 in the nonlinear region 120, i.e., to keep the activation function element-wise, a dispersive waveguide segment 122 before the nonlinear region 120 can be used to offset the neuron modes 141 and respective subharmonic modes 121 in time to ensure that the nonlinearity acts in an element-wise fashion (i.e., without unwanted cross-coupling). A dispersion-compensating waveguide segment 124 between the nonlinear region 120 and the microring resonator 110 re-aligns the neuron modes 141 in time after the nonlinearity. For example, if the dispersive waveguide segment 122 is normally dispersive, then the dispersion-compensating waveguide segment 124 may be anomalously dispersive, or vice versa.

Passive Coupling

The optical neural network 100 in FIGS. 1A and 1B can be configured with coupling coefficients selected so that the fully connected layers 110 employ propagating neuron modes flying past microring resonators. Their mixing will be enabled by a FWM interaction with the control pumps in the resonator. To see how this optical neural network 100 works, consider a resonator that supports two neuron modes and two pump modes. The lower two modes are the pumps that drive the system, denoted by operators ($\hat{p}_1$, $\hat{p}_2$). The two higher-frequency modes act as neurons, denoted by ($\hat{a}_1$, $\hat{a}_2$). The Hamiltonian associated with the interaction of the four waves in the resonator is:

$$\hat{H} = \hbar\chi\left(\hat{p}_1\hat{p}_2^{\dagger}\hat{a}_1\hat{a}_2^{\dagger}\right) + H.c.,$$

where H. c. is the Hermitian conjugate.

The coupling coefficient $\chi$ in this Hamiltonian determines the strength of the interaction, incorporating effects from several parameters including the nonlinear susceptibility of the material of the cavity (resonator), phase matching, and mode volume realized in the cavity. The pumps are assumed to be strong classical modes of light and their operators can be replaced by a classical complex amplitude $\hat{p}_i \mapsto p_i = \sqrt{\langle \hat{n}_i \rangle} e^{i\theta}$, involving the expectation value of the number of photons $n_i$ in the given pump mode and its phase $\theta$. Furthermore, these pumps are much stronger than the other modes and hence are non-depletive. We assume that the resonances of the modes obey the FWM energy matching condition, such that $$\omega_{p_2} - \omega_{p_1} = \omega_{a_2} - \omega_{a_1}.$$

The neuron and pump modes couple from the waveguide into the microring resonator at fixed coupling rate of $\gamma$, for simplicity taken to be the same for all modes. The total loss rate is $\Gamma=\gamma+\gamma_H$, where $\gamma_H$ is the internal (intrinsic) loss rate.

The time-dynamics of the modes can be solved using Coupled Mode Theory. The coupled amplitude equations for this system are:

$$\dot{P}_i = 0 = -\frac{\Gamma}{2}P_i - \sqrt{\gamma}S_{in,P_i}$$

$$\frac{dA_1}{dt} = \left(-\frac{\Gamma}{2} + i\chi|P_1|^2 + i\chi|P_2|^2\right)A_1 + (\chi P_1 P_2^*)A_2 - \sqrt{\gamma}S_{in,1}$$

$$\frac{dA_2}{dt} = \left(-\frac{\Gamma}{2} + i\chi|P_1|^2 + i\chi|P_2|^2\right)A_2 - (\chi P_1 P_2^*)A_1 - \sqrt{\gamma}S_{in,2}$$

$$S_{out,i} = S_{in,i} + \sqrt{\gamma}A_i,$$

where $A_i$ and $P_i$ represent, respectively, the amplitude of the $i^{th}$ neuron mode and the amplitude of the $i^{th}$ pump mode inside of the resonator. The pump amplitudes are set to a scale much higher than the scale of the neuron activations so that direct neuron-neuron interactions can be neglected. The encoded data is introduced into the system via the input waveguide mode, denoted by $S_{in,i}$ (representing the activation values of the neurons). The output neuron modes, after interacting in the ring, are denoted by $S_{out,i}$. The $P_i$ values can be corrected to account for nonlinear interactions purely between the pumps; however, this is a straightforward matrix inversion problem that does not affect the dynamics discussed below.

Extending this formalism to N neurons comprising a single layer of the optical neural network shows that pumps which are $n^{th}$ nearest neighbors (i.e., have a frequency difference of $n\times\Omega_{FSR}$ for a ring with the free spectral range $\Omega_{FSR}$) couples all the neuron modes at that frequency difference. This gives rise to cross-coupling terms, and hence the modified coupled amplitude equations for the $i^{th}$ neuron mode can be written as:

$$\frac{dA_i}{dt} = \left(-\frac{\Gamma}{2} + i\chi\sum_{m=1}^{N}|P_m|^2\right)A_i - \chi\left[\sum_{j>i}^{N}\sum_{k=1}^{j-1}(P_k P_{k+j-i}^*)A_j \sum_{j<i}^{i-1}\sum_{k=1}^{j}(P_k^* P_{k+i-j})A_j\right] - \sqrt{\gamma}S_{in,i}$$

Without loss of generality, assuming that the first pump $P_1$ is much stronger than the other pumps permits the cross-coupling terms to be neglected, leading to:

$$\frac{dA_i}{dt} = \left(-\frac{\Gamma}{2} + i\chi|P_1|^2\right)A_i - \chi\left[\sum_{j>i}^{N}(P_1 P_j^*)A_j - \sum_{j<i}^{i-1}(P_1^* P_j)A_j\right] - \sqrt{\gamma}S_{in,i}$$

Taking this expression together with the expression above for $S_{out,i}$ makes it possible to rewrite the system of coupled mode equations in a matrix form:

$$\vec{S}_{out} = \vec{S}_{in} + \sqrt{\gamma}\left[P^{-1}\left(\dot{\vec{A}} + \sqrt{\gamma}\vec{S}_{in}\right)\right],$$

where the matrix P has constant diagonals (also known as a Toeplitz matrix). P's $n^{th}$ off-diagonal has the value $P_1P_n$. In this model, the amplitudes of the output modes depend on the inverse of the matrix P, i.e., on the pump amplitudes that encode the linear operation being performed.

A deep neural network typically includes several layers, which can be implemented in an optical neural network by cascading multiple microring resonators or other multimode cavities/resonators consecutively. To enable repeated application of such a transformation, the temporal envelope of the pulse should not vary significantly as it undergoes transformations through FWM. If the $S_{in}$ pulses have a Gaussian temporal envelope, the Gaussian shape of the output pulses $S_{out}$ can be preserved if the pulses are much longer than $1/\gamma$. For pulses with a large enough duration, it is possible to make the adiabatic elimination $$\dot{\vec{A}} = 0,$$

allowing work in the steady-state regime.

Figure 2:
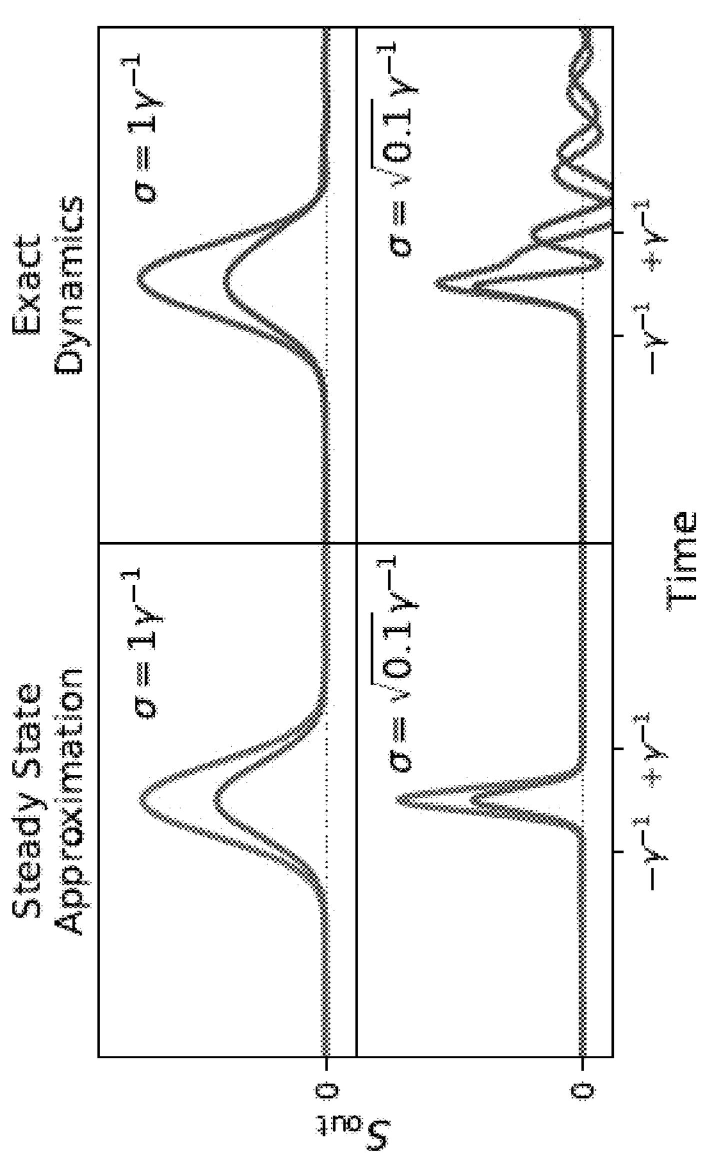
FIG. 2 shows a comparison of the steady-state model and the full model for pulses with Gaussian envelopes of different durations.

FIG. 2 illustrates this approximation by comparing the solution of the steady-state model with the solution of the full dynamics. The right column illustrates the correct profile of $S_{out}$, while the left column show the profile as predicted by a steady-state model. The steady-state model breaks down for pulses much shorter than $1/\gamma$. As the length of the input pulses increases the steady-state model begins to closely resemble the model of the full dynamics. This approximation makes it possible to simplify the output neuron modes as $\vec{S}_{out}=(I_N+\gamma P^{-1})\vec{S}_{in}=T\vec{S}_{in}$, where T is ($I_N$ is the N-dimensional identity matrix):

$$\begin{aligned}T &= I_N + \gamma P^{-1}\\ &= I_N + \gamma\big(-\Gamma/2 + i\chi|P_1|^2 P_1P_2^*\chi P_1P_3^*\chi \ldots P_1P_N^*\chi - P_1^*P_2\chi - \Gamma/2 +\\ &\quad i\chi|P_1|^2 P_1P_2^*\chi \ldots P_1P_{N-1}^*\chi - P_1^*P_3\xi - P_1^*P_2\chi - \Gamma/2 + i\chi|P_1|^2 \ddots \ldots\\ &\quad P_1P_{N-2}^*\chi \vdots \ddots \ddots \ddots \vdots \vdots \ddots \ddots \vdots -\\ &\quad P_1^*P_{N-1}\chi \ldots - P_1^*P_2\chi - \Gamma/2 + i\chi|P_1|^2 P_1P_2^*\chi - P_1^*P_N\chi \ldots -\\ &\quad P_1^*P_3\chi - P_1^*P_2\chi - \Gamma/2 + i\chi|P_1|^2\big)^{-1}\end{aligned}$$

The Toeplitz nature of the N×N matrix P gives N degrees of freedom, as opposed to $N^2$ degrees of freedom encoded in the weights of a fully-connected deep neural network. This implies that the transformation via a single layer of the form T would span only a fraction of the space that would otherwise be spanned by the full group of unitary transformations.

Expressivity quantifies the group of operations that can be spanned by matrices of the form T. The expressivity is the average fidelity with which a parametrized T can represent an arbitrary unitary operation U. Numerically, the expressivity can be estimated by sampling M Haar-random unitaries $\{U_i\}_{1\le i\le M}$ and for each one using gradient descent to find the $T_i$ which approximates it most closely. The expressivity can be estimated as $$F = 1 - \frac{1}{M}\sum_{i=1}^{M}\sqrt{tr\left[(T_i - U_i)(T_i - U_i)^\dagger\right]},$$

which both accounts for imperfections due to losses (deviations from unitarity) and insufficient degrees of freedom.

The transformation performed by a single layer of the neural network, i.e., a single matrix of the form T, does not reach an expressivity large enough to perform arbitrary unitary transformations. To address this problem, we introduce sub-layers, i.e., a layer whose operation is characterized by several non-commuting cascaded matrices of the form T (which we call sub-layers). Physically, a layer with sub-layers can be implemented with multiple subsequent ring resonators, with one ring resonator per sub-layer. Introducing multiple sub-layers into a layer, i.e., multiplying multiple matrices in the form of T, makes it possible to span larger groups of operations.

Figure 3:
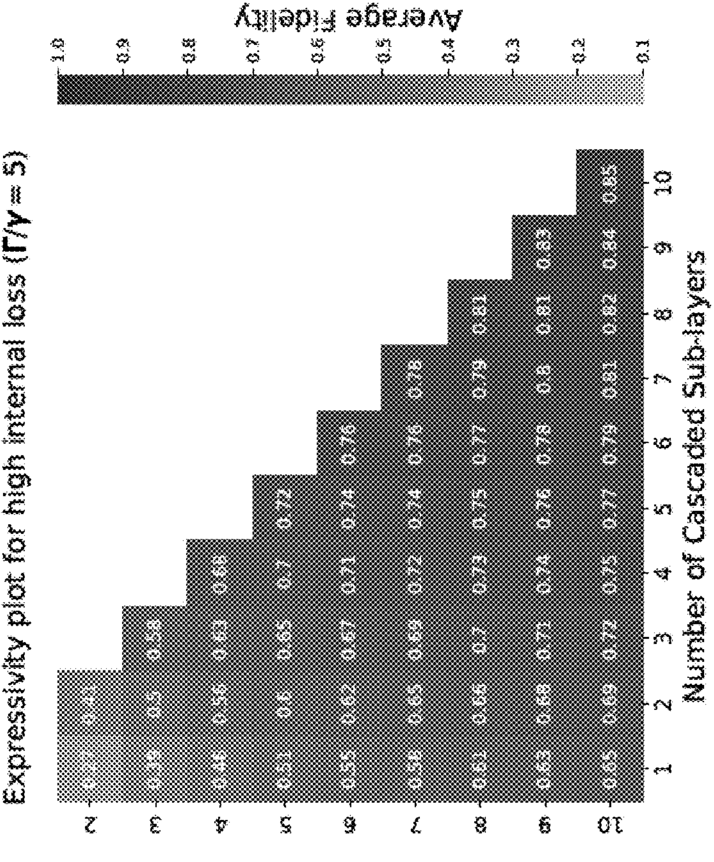
FIG. 3 shows expressivity plots for no internal loss (left) and high internal loss (right) as functions of the matrix dimensions (left axes) and the number of cascaded sub-layers in a neural network layer (bottom axes) for an optical neural network with passive coupling.
Figure 3:
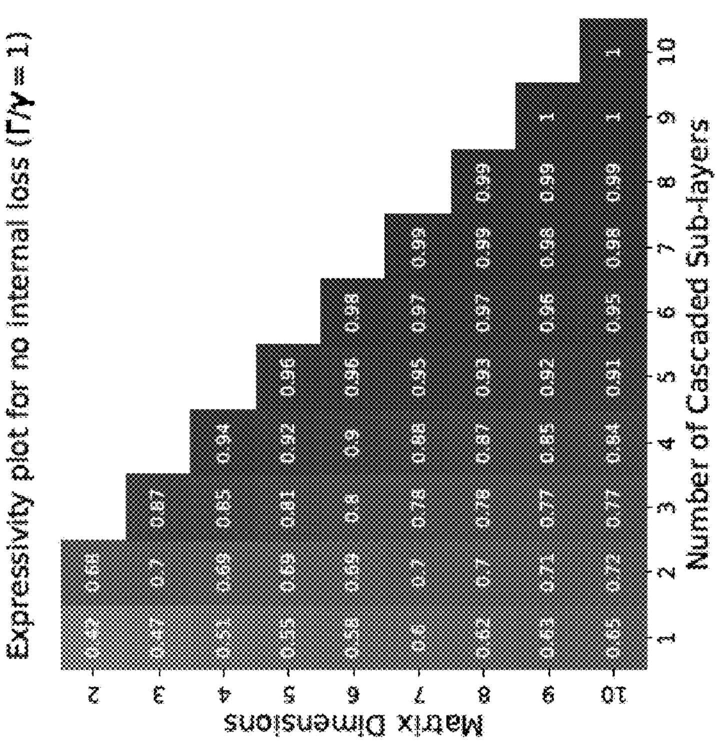

FIG. 3 shows plots quantifying the expressivity of the transformation ΠT in different parameter regimes of the passive coupling scheme. Each plot displays the average expressivity versus the number of sub-layers (the horizontal axis) for a given matrix dimension (the vertical axis). On the left, the expressivity at no internal loss ($\Gamma/\gamma=1$) reaches unity at sufficiently many sub-layers. On the right, the expressivity at high loss ($\Gamma/\gamma=5$) is consistently lower. FIG. 3 shows that the expressivity of these compound operations as a function of matrix dimension and number of sub-layers reaches unity for larger matrices, at higher sub-layers. This implies that cascading multiple matrices in a single layer can span the group of unitary operations.

A factor that negatively influences the expressivity is the presence of loss, $\gamma_H$. Up to this point, the internal losses have been neglected, i.e., $\gamma_H=0$, thus working in the parameter regime $\Gamma/\gamma=1$. The diagonal of P contains the total loss rate of each neuron mode. Performing the same estimation of expressivity in the parameter regime where $\gamma_H>0$ illustrates the influence of intrinsic losses $\gamma_H$ on the expressivity as shown at right in FIG. 3. The optimization results indicate that even at a higher number of sub-layers, the expressivity does not reach unity. Due to loss, the compound operation does not span the group of unitary operations.

Figure 4:
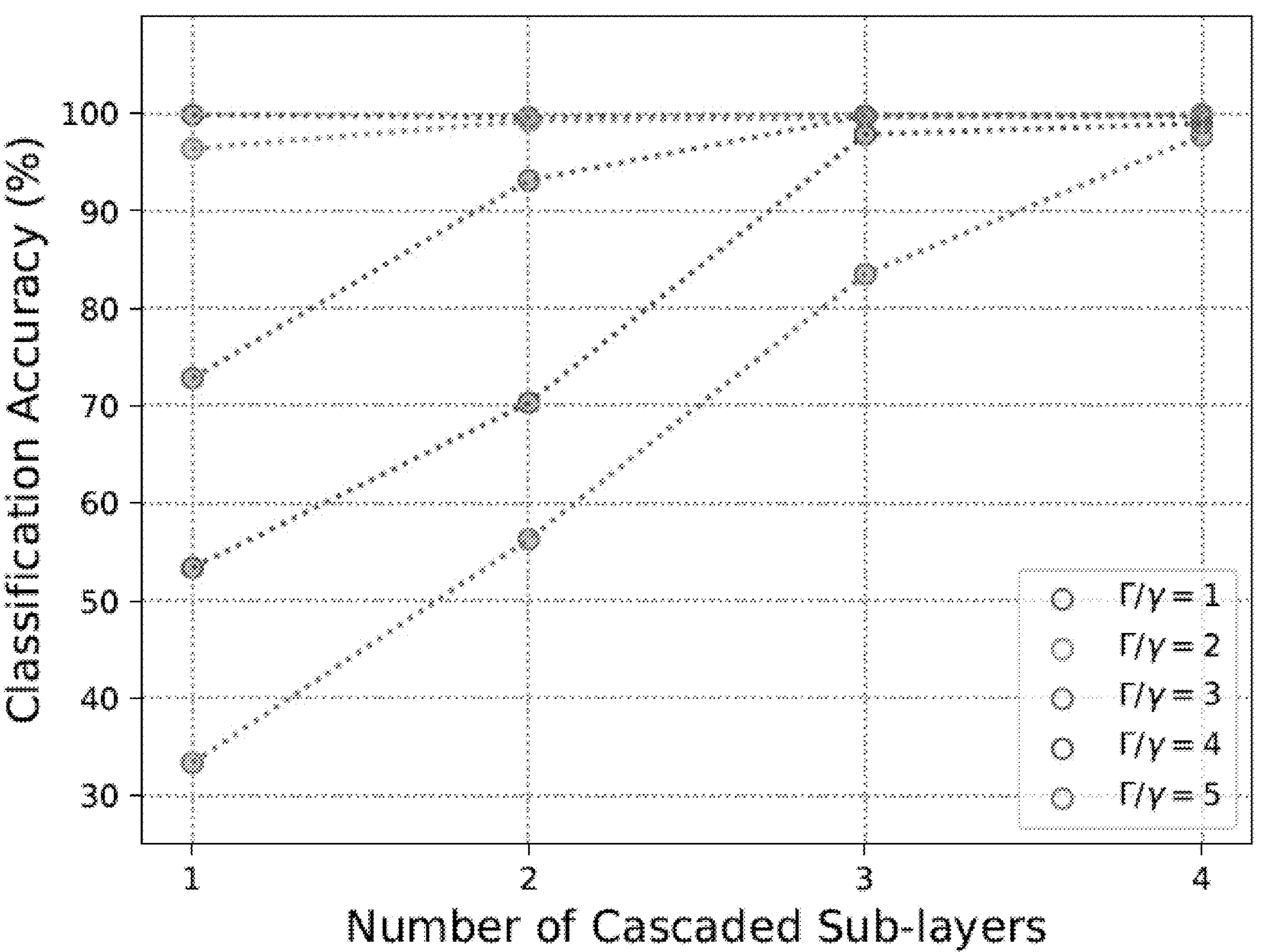
FIG. 4 is a plot of the classification accuracy on the Iris dataset as a function of the number of cascaded sub-layers for different $\Gamma/\gamma$ ratios for the passive coupling scheme. A larger number of sub-layers improves the classification accuracy, while a larger $\Gamma/\gamma$ ratio is detrimental to the performance of the network.

FIG. 4 illustrates the holistic effect of varying the number of sub-layers and the loss ratio $\Gamma/\gamma$ through the machine learning task of linear classification of the benchmark Iris dataset. This dataset includes four features and three output classes, with one of the classes being linearly separable from the other two. The architecture of our optical neural network is a single compound layer between the input features and the predicted classes, without an elementwise activation function. Varying the number of sub-layers in the compound layer shows that for all $\Gamma/\gamma$ ratios, a larger expressivity (more sub-layers) indicates a better performance in the classification. Moreover, for a given number of sub-layers, higher losses are detrimental to the performance of the network.

Transformations of the form T can be realized via three-wave mixing as well, with a single pump mode instead of two as proposed above. Solving for the transformation matrix T gives a similar result to the one presented above (three-wave mixing does not give rise to cross-coupling between different neuron modes). The Hamiltonian associated with the interaction of the three interacting waves is $\hat{H}=\chi(\hat{p}\hat{a}\hat{b}^\dagger)$+H. c., where $\hat{p}$ is the single pump mode. These modes obey the energy matching condition that $\omega_p=\omega_b-\omega_a$.

Experimentally implementing this system, however, presents engineering challenges in the design of the microring resonator. To satisfy the energy matching condition, the frequency of the pump mode should be equal to the difference in frequencies of the neuron modes. This would result in pump modes operating at frequencies much smaller than the neuron modes, i.e., integer multiples of the Free Spectral Range (FSR) of the microring resonator, which would then support modes over multiple octaves. Spanning across multiple octaves gives rise to differences in refractive indices and quality factors for modes at different frequencies. This can lead to difficulties in maintaining the resonance condition and phase matching for high-efficiency wave-mixing. Alternatively, pump and neuron modes across multiple octaves could be implemented as an electro-optic frequency comb; however, this approach could be limited by the speed of the electronics used to couple modes across large frequency bands.

While passive coupling is one way to perform programmable matrix multiplication operations, the pulses should have a Gaussian envelope with a long duration to perform those operations properly. Furthermore, our optical neural network has multiple cascaded microring resonators to ensure full expressivity of each layer. These pulses undergo FWM in the cascaded microring resonators and propagate through consecutive microring resonators. To overcome these constraints, the series of microring resonators can be replaced with a single ring resonator that actively captures the neurons, and then stores them long enough to perform the FWM operations. In such a setup, the processing speed can be increased almost arbitrarily by scaling up the strength of the pumps. This active coupling approach is presented immediately below.

Active Coupling

An optical neural network with a lower circuit size can use microring resonators with active coupling, as opposed to the linearly growing sequence of cascaded microring resonators discussed above. In an optical neural network with active coupling, the neuron activations are still encoded in the complex amplitudes of the neuron frequency states and the linear transformations are encoded in the amplitudes of the pump modes. However, the microring resonators capture and store the neuron modes for the entire FWM process, as opposed to flying by. Such active coupling uses controllable couplings $\gamma(t)$ between the ring and waveguide. The microring resonator's quality factor may limit how long it can operate on neuron modes before information loss.

In an optical neural network with active coupling, the pump modes are time-dependent in order to enable full expressivity over the neuron modes, i.e., the application of any unitary operation. This time dependence is a continuous analog to the set of cascaded ring resonators discussed above. The pump amplitudes are represented as piece-wise constant with step durations of $\Delta t$ to simplify numerical experiments. The ring-waveguide coupling $\gamma$ is controllable in order to permit the active coupling of the neuron modes, as depicted in FIG. 1C (described above). During capture or release, $\gamma$ is increased in order to transfer the neuron mode. During the FWM process, $\gamma$ is kept at a low or minimal value to reduce or avoid information loss, thus $\Gamma=\gamma+\gamma_H=\gamma_H$. The Hamiltonian of the system during FWM is given by $$\hat{H} = \hbar_\chi\left(\hat{p}_1\hat{p}_2^\dagger\hat{a}_1\hat{a}_2^\dagger\right) + H.c.,$$

assuming phase-matched modes. For such a ring, as described above, the coupled amplitude equations for N neuron modes are given by $$\dot{P}_i(t) = 0 = -\frac{\Gamma}{2}P_i(t) - \sqrt{\gamma}\,S_{in,P}(t),$$

-continued $$\frac{dA_i}{dt} = \left(-\frac{\Gamma}{2} + i\chi|P_1|^2\right)A_i - \chi\left[\sum_{j>i}^{N}(P_1P_j^*)A_j - \sum_{j<i}^{i-1}(P_1^*P_j)A_j\right].$$

In terms of matrix-vector operations, $dA_i/dt$ can be written as $\dot{\vec{A}}=P\vec{A}$, where P is the Toeplitz matrix. The solution to this system of equations (at the end of a period Δt during which P is constant) is $\vec{A}(t=\Delta t)=e^{\Delta tP}\vec{A}(t=0)$. While P is assumed to be assumed piecewise constant for simplicity in this example, a freely evolving P is just as easy to work with.

Just as in the previous case, this single-timestep solution provides N degrees of freedom, as opposed to the $O(N^2)$ degrees of freedom in a fully trainable weight matrix. In this case, however, because the pumps are time-dependent, each ring resonator can implement multiple sub-layers by varying the values of the pumps in Δt timesteps, without exiting and re-entering the ring resonators. Thus, after a time of NΔt, the net transformation should have $N^2$ degrees of freedom, increasing the expressivity.

Figure 5:
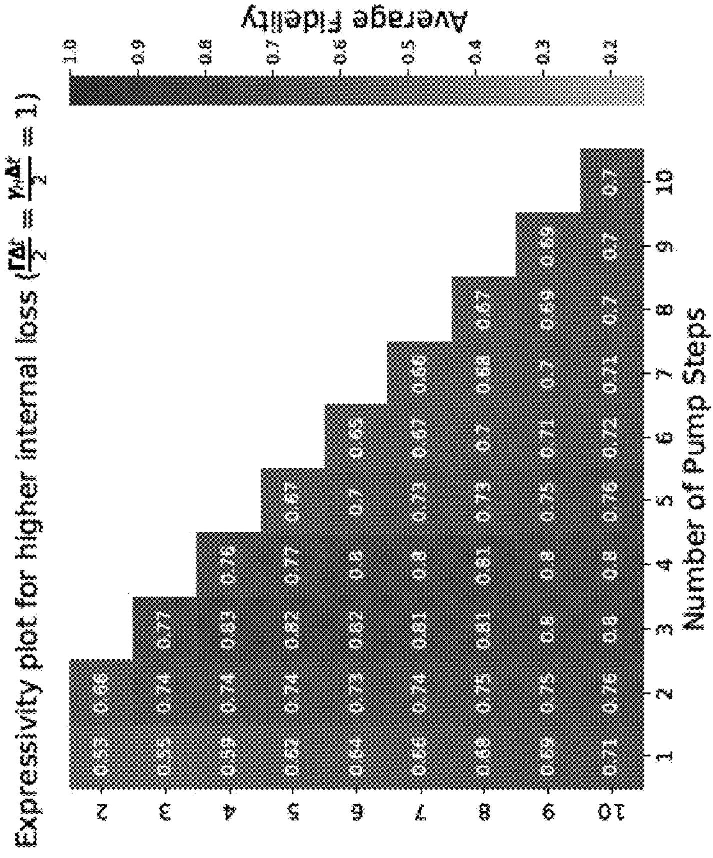
FIG. 5 shows expressivity plots for no internal loss (left) and high internal loss (right) as functions of the matrix dimensions (left axes) and the number of cascaded sub-layers in a neural network layer (bottom axes) for an optical neural network with active coupling.
Figure 5:
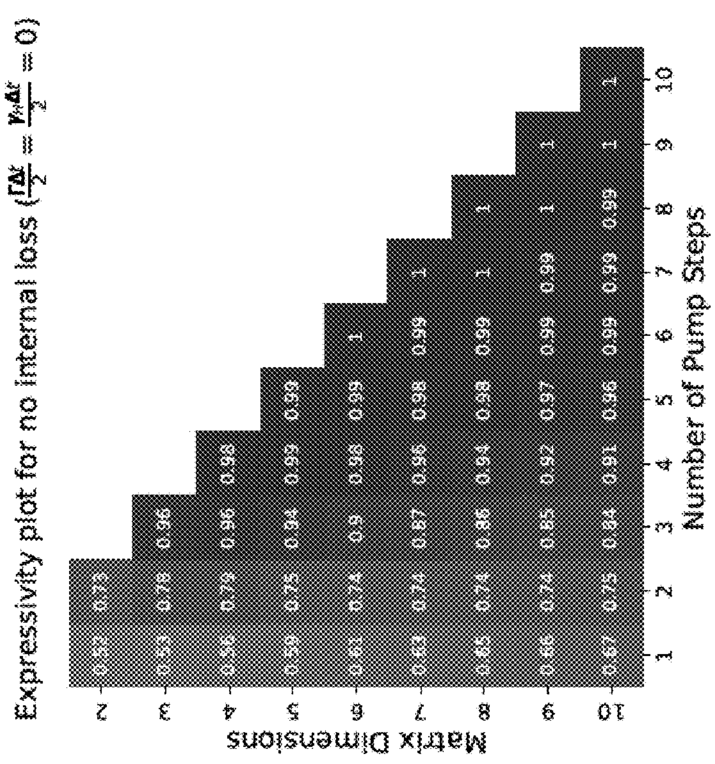

FIG. 5 shows a numerical evaluation of the expressivity for different values of Γ, as described above with respect to FIG. 3. In the ideal case ($\Gamma\Delta t=\gamma_H\Delta t=0$), shown at left in FIG. 5, the expressivity grows upon cascading sub-layers just as in FIG. 3, approaching unity. For a much more pessimistic case where $$\frac{1}{2}\Gamma\Delta t = 1$$

(FIG. 5, right), however, there is a high sensitivity to the loss. Cascading a few sub-layers increases the average fidelity, with adding more sub-layers causing the expressivity to decrease as the pulses entering the decay regime. In this case, the final expressivity, even after cascading enough layers to obtain $N^2$ degrees of freedom does not reach unity.

Figure 6:
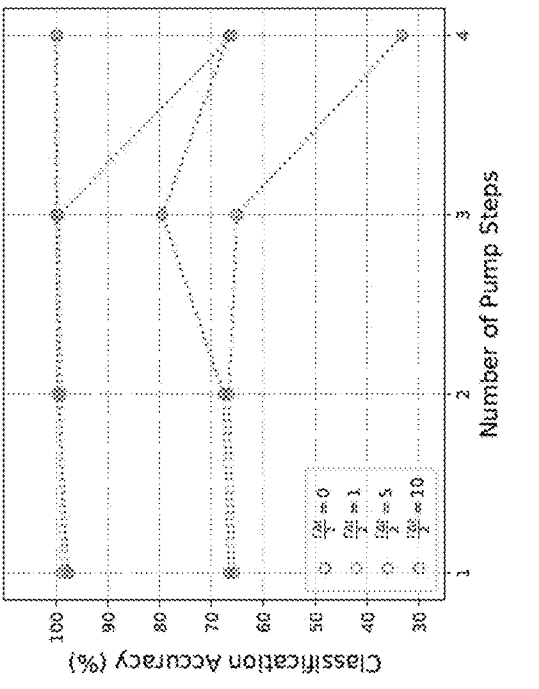
FIG. 6 is a plot of the classification accuracy on the Iris dataset as a function of the number of cascaded sub-layers (pulse duration) and internal cavity loss rates for the case of active coupling. A larger number of pump steps increases then decreases the performance of the network, as expected given the behavior of the expressivity shown in FIG. 5.

FIG. 6 shows the impact of increasing loss on the classification of the Iris dataset. The optical neural network used to perform these classifications has an architecture similar to the one described above, with only a single layer, varying the pulse duration from Δt (single step) to 4Δt (four piecewise constant steps). For fairly small values of ΓΔt, the optical neural network performs well in the task of linear classification, giving us an upward of 99% accuracy. Increasing ΓΔt, however, increases the classification accuracy only at first, due to the increase in expressivity as shown in FIG. 5. Cascading more than three sub-layers increases the losses, decreasing the overall expressivity and degrading the performance of the optical neural network.

Computational Speed

As explained above, the rate at which the wave-mixing interactions happen scales as χP'P", where P' and P" denote the pump amplitudes of the main pump and an arbitrary secondary pump. Therefore, the higher the pump power, the faster the computation, up to loading and heating constraints. The value for χ for a given piece of hardware is derived below, giving realistic engineering constraints on the computational speed. The nonlinear component of the Hamiltonian is given by $$\hat{H} = \int \frac{\chi^{(3)}\hat{D}^4}{4\varepsilon_0^3\eta^8}dr,$$

where $\chi^{(3)}$, $\varepsilon_0$, and η are the FWM nonlinear susceptibility, vacuum permittivity, and refractive index, respectively, of the material, and $\hat{D}$ is the electrical displacement field operator. The field operator $\hat{D}$ is the sum of pump or neuron modes $\hat{m}$ that can be written in terms of the eigenmode d(r) as.

$$\hat{D}_m(r) = \sqrt{\frac{\hbar\omega_m}{2}}\,\hat{m}d_m(r) + H.c.,$$

where $\hat{m}$ is the creation operator for the given mode and the normalization condition $\int|d(r)|^2dr=\varepsilon_0\eta^2$ is fulfilled. Considering the energy matching conditions for two neuron modes $\hat{a}_1$ and $\hat{a}_2$ and two pump modes $\hat{p}_1$ and $\hat{p}_2$ gives $$\hbar\chi = \frac{3}{2}\frac{\chi^{(3)}}{\varepsilon_0\eta^4 V_{FWM}}\sqrt{\hbar^4\omega_{a_1}\omega_{a_2}\omega_{p_1}\omega_{p_2}},$$

where the FWM mode volume $V_{FWM}$ is $$\frac{1}{V_{FWM}} = \frac{\int_{nl} d_{a_1}^i d_{a_2}^{j*} d_{p_1}^k d_{p_2}^{l*}\,dr}{\sqrt{\int|d_{a_1}|^2dr\int|d_{a_2}|^2dr\int|d_{p_1}|^2dr\int|d_{p_2}|^2dr}}$$

$\int_{nl}$ denotes integration over the volume of the nonlinear material and i, j, k, l denote the spacial components of the fields between which nonlinear interaction is enabled.

For a silicon nitride resonator $$\left(\eta = 2.02 \text{ and } \chi^{(3)} = \frac{4}{3}\eta^2\varepsilon_0 c \approx 3.5\times10^{-21}m^2V^{-2}\right)$$

with good phase matching such that the FMW mode volume $V_{FWM}$ is comparable to the geometric volume (about 1300 $\mu m^3$ for a 115 μm radius, 2.5 μm width, and 0.73 μm height), $\chi\approx4.2\ s^{-1}$.

The period of complete exchange of energy between two neuron modes can be calculated via the coupled mode equations, leading to $\Delta t=2\pi/(\chi\langle P_1\rangle\langle P_2\rangle)$, where the maximum amplitudes $\langle P_*\rangle$ are measured in square root of average number of photons. These amplitudes can be taken as a worst-case estimate of the energy requirements for an inventive optical neural network. As shown in FIGS. 5 and 6, increasing ΔtΓ beyond unity significantly decreases the optical neural network's performance due to losses, which leads to the requirement $\langle P_1\rangle\langle P_2\rangle>2\pi\Gamma/\chi$. A silicon nitride resonator can have a quality factor $Q\approx10^6$ and $\Gamma=\gamma_H=\omega/Q\approx1\ ns^{-1}$, therefore $2\pi\Gamma/\chi\approx10^9$. This implies that the main pump mode should contain on the order of one billion photons, leading to thermal heating losses from the main pump on the order of $\Gamma\hbar\omega\langle P\rangle^2\approx100$ mW.

Figure 7:
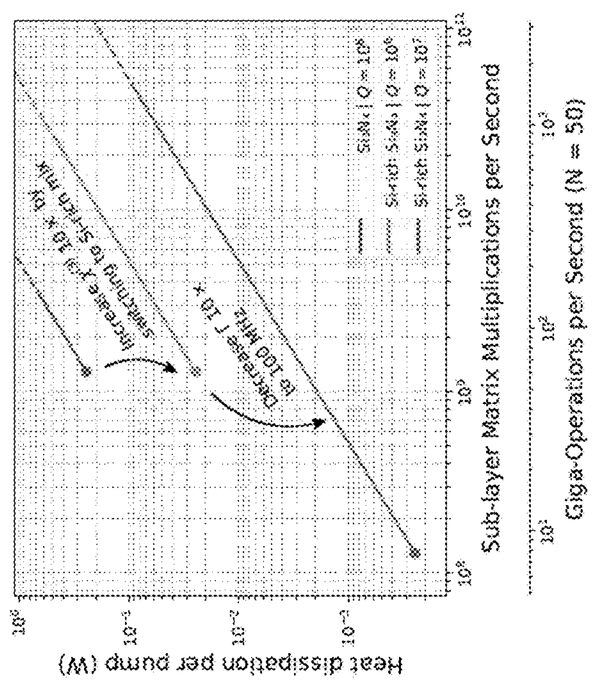
FIG. 7 is a plot of heat dissipation per pump versus sub-layer matrix multiplications per second for an optical neural network with active coupling.
Figure 7:

To summarize, increasing the power of the pumps ($\propto\langle P\rangle^2$) would linearly increase the rate at which computations are performed ($\chi\langle P\rangle^2$) and linearly increase the power dissipated during the computation ($\Gamma\hbar\omega\langle P\rangle^2$). For a typical ring resonator, this implies a computational speed of 1 GHz (1 billion sub-layer matrix multiplications per second) at dissipation from the main pump of 100 mW. As seen in FIG. 7, both of these figures of merit can be drastically improved in the very near term by employing, e.g., higher $\chi^{(3)}$ in slightly more exotic materials like silicon-rich silicon nitride or AlGaAs and higher quality factors. Curiously, there is a lower bound for the computational speed of an inventive optical neural network: the pump power should be high enough that the computation happens faster than the rate of decay of the neuron modes. On the other hand, microring resonators with arbitrarily large quality factors could limit pulse capture efficiency due to their decoupling from the local environment. The controllable coupling coefficient $\gamma(t)$ introduced for active coupling bypasses this issue by enabling instantaneous tuning of the coupling between the resonator and waveguide with more sophisticated control and fabrication.

The speed of performing a single sub-layer is a constant that does not depend on the number of neurons. Moreover, as seen in the various examples of optical neural networks disclosed here, the number of sub-layers itself does not scale any worse than linearly with the number of neurons (and frequently is much better), demonstrating additional architectural advantages.

To compare the throughput of DNN accelerator architectures, it is helpful to introduce the Tera Operations per Second (TOPS) figure of merit, the number of scalar multiplication (and addition) operations implicitly performed by the accelerator. ONNs have achieved processing speeds of about 10-100 TOPS, while heuristically designed state-of-the-art digital electronic DNN accelerators operate at approximately similar speeds. A single sub-layer matrix multiplication (single instance of FWM) in an inventive optical neural network modulates all the neuron modes simultaneously. Therefore, during one FWM period of duration $\Delta t$, it performs the equivalent of $O(N)$ multiply-accumulate (MAC) operations. A general matrix-vector multiplication would involve $O(N^2)$ MACs and can be accomplished with multiple sub-layer multiplications (multiple instances of FWM) as discussed above. For a numerical performance estimate, consider N=50 since matrix multiplication can be readily implemented on 50 frequency modes today. With present-day hardware parameters, FIG. 7 shows that an inventive optical neural network with active coupling reaches processing speeds of 10-100 GOPS at comparatively low thermal overhead. With improved hardware parameters (such as larger quality factors, lower mode volumes, and higher effective nonlinear susceptibility) and more neurons (e.g., N in the hundreds of modes thanks to frequency combs), an inventive optical neural network would efficiently scale into the TOPS regime. And unlike in other digital and photonic accelerators, the operations performed by an inventive optical neural network are also unitary and reversible, enabling a variety of in situ training and other modalities of computation, including possibly quantum computation.

Nonlinearities for Optical Neural Networks With Cavity Modes as Neurons

A neural network uses nonlinear activation functions, or nonlinearities, to operate on the outputs of each fully connected layer. Other optical neural networks have relied on thermo-optic effects, hybrid optical-electronic schemes, semiconductor lasers, and saturable absorption for nonlinearities. An inventive optical neural network uses nonlinear interactions facilitated by a $\chi^{(2)}$ medium, followed by controllable capture into a ring resonator. This nonlinearity is called a neural activation function and is explained below.

The nonlinearity for an inventive optical neural network is based upon a second-order nonlinear interaction (e.g., in a lithium niobate waveguide, characterized by its $\chi^{(2)}$ susceptibility coefficient) and operates as follows. First, the neuron mode from the resonator in which the matrix multiplication was performed is released into the waveguide. The temporal envelope of the neuron mode is distorted via the nonlinear interaction with an externally pumped pulse—the subharmonic mode. This subharmonic mode has a frequency of half of the neuron mode. Following the distortion, the neuron mode is selectively captured into the microring resonator that forms the subsequent layer of the neural network. Thus, the distorted pulses are selectively absorbed into the microring resonator, with an absorption efficiency dependent on the amount of distortion. The nonlinear distortion is stronger for higher-amplitude pulses, giving rise to a total effective nonlinearity.

To see how this nonlinearity operates, consider the envelope distortion dynamics for a neural pulse interacting with a subharmonic pump pulse in a waveguide. The envelopes are parameterized as $E_n(z, t)$ and $E_{sub}(z, t)$ where z is the spacial coordinate along the length of the waveguide. These envelopes obey $$\frac{\partial E_n}{\partial z} + \frac{\eta}{c}\frac{\partial E_n}{\partial t} = -\kappa E_{sub}^2 - \alpha E_n$$

$$\frac{\partial E_{sub}}{\partial z} + \frac{\eta}{c}\frac{\partial E_{sub}}{\partial t} = \kappa E_n E_{sub}^* - \alpha E_{sub}$$

$$\kappa = \frac{\omega}{c}\chi^{(2)}s.$$

where s is a unitless measure of the mode overlap between the neural and subharmonic modes, $\omega$ is the frequency of the neuron mode, and $\alpha$ is the waveguide loss. For specificity, consider Gaussian wavepackets for the input neuron modes (released from the ring that has been performing the matrix multiplication of the previous layer) of the form $E_n=\epsilon_n \exp\{-[-(z/c)+t-t_0]^2/(2w^2)\}\exp(-i\varphi_0)$, where w is the temporal length of the packet, $\varphi_0$ is the phase of the neuron activation, and $\epsilon_n$ gives the field amplitude scale. Similarly, for the subharmonic pump, set $E_{sub}=\epsilon_s \exp\{-[-(z/c)+t-t_0]^2/(2w^2)\}$ (an equally valid option would be a continuous wave $E_{sub}=\epsilon_s$). Next, solve for the evolution of $E_n(z, t)$ numerically. The dimensionless parameters that emerge as chiefly governing these dynamics are the effective strength of the nonlinear interaction $\kappa\epsilon_s Z_0$ and the strength of the neuron mode relative to the fixed subharmonic mode, $\epsilon_n/\epsilon_s$. The length of the $\chi^{(2)}$ waveguide is denoted $z_0$.

The distorted neuron envelopes are then actively captured into the next ring via a controllable ring-waveguide coupling $\gamma(t)$. The dynamics of the capture without interactions from the pump modes are governed by $$\frac{dA}{dt} = -\frac{(\gamma(t)+\gamma_H)}{2}A + \sqrt{\gamma(t)}\,S_{in}$$

$$S_{out} = S_{in} + \sqrt{\gamma(t)}\,A,$$

where $S_{in}(t)=E_n(0, t)$ is the incoming neuron mode's envelope, $S_{out}$ is the outgoing (not captured) signal, and A is the neuron mode amplitude captured in the resonator. Fixing $S_{out}=0$ makes it possible to solve for the coupling $\gamma(t)$ that would completely capture a given envelope $S_{in}$. However, high neural activations could lead to strong envelope distortions, which in turn could prevent full capture of the mode, thus providing for the equivalent of a nonlinear element-wise activation function in an inventive optical neural network. This implementation naturally supports negative activations, unlike the vast majority of optical approaches.

Figure 8:
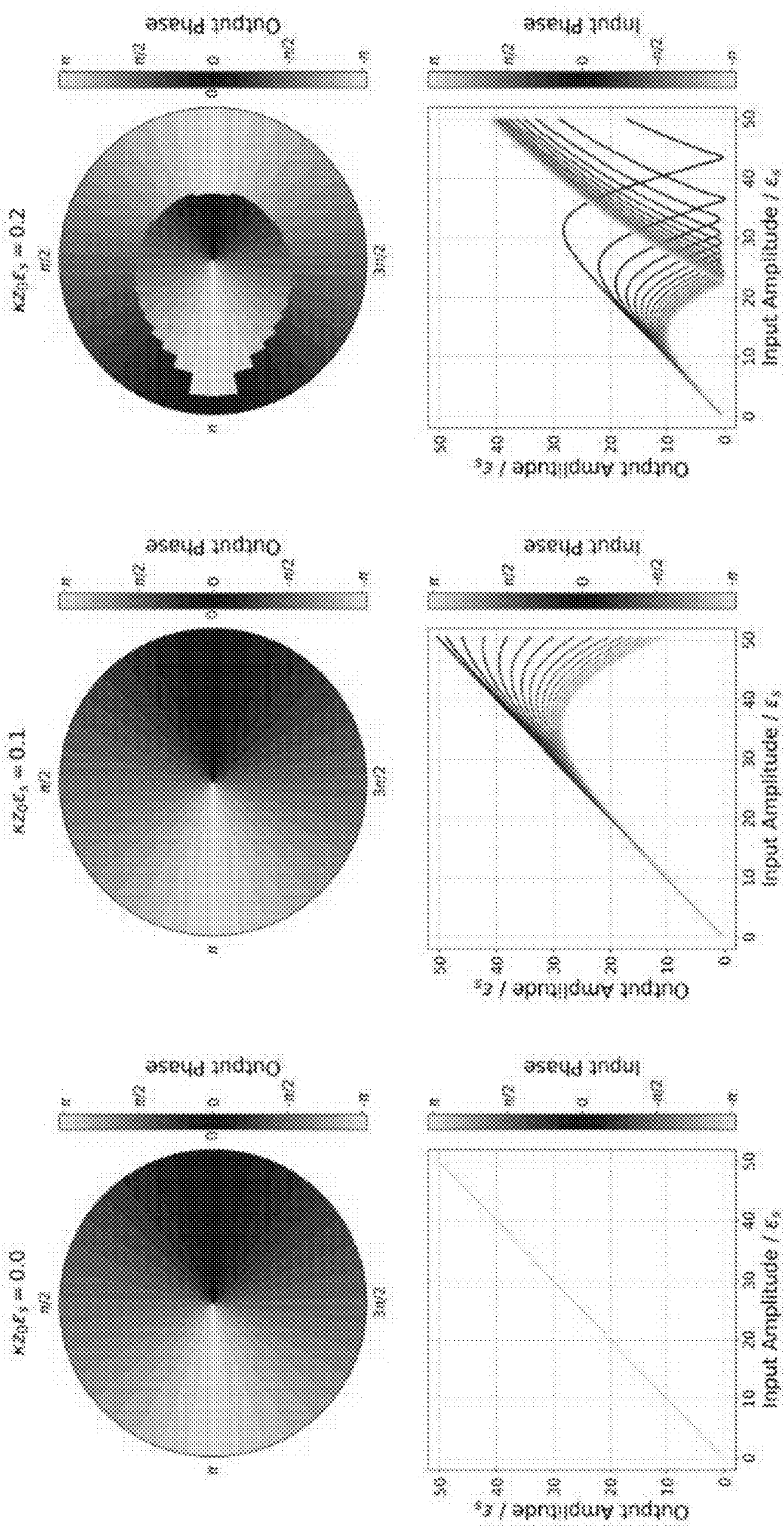
FIG. 8 illustrates the nonlinear activation function realized in an inventive optical neural network, with the upper row of plots showing the nonlinearity in the phases and the second row showing the nonlinearity in the amplitudes (the first column shows no subharmonic, meaning the nonlinear activation function is purely linear).

FIG. 8 shows the neural activation function realized with the optical hardware shown in FIG. 1C. The top row of polar plots gives the phase of a neuron mode post-activation function (indicated by the shading) versus the phases of an input mode (polar coordinate) and its amplitude (radial coordinate). FIG. 8 plots the nonlinearity for three different values of the dimensionless parameter $\kappa\epsilon_s z_0 \in \{0.0, 0.1, 0.2\}$ from left to right. The plots in the bottom row of FIG. 8 show the output amplitudes (vertical axes) versus the input amplitudes (horizontal axes), scaled to the fixed amplitude of the pump pulses $\epsilon_s$. In the absence of nonlinear interaction, i.e., $\kappa\epsilon_s z_0=0.0$, the neural activation function behaves as a linear activation function. The nonlinearity of the neural activation function becomes more pronounced as the rate of optical nonlinear interactions increases.

The results of the numerical experiments show that $\kappa\epsilon_s z_0\approx 0.2$ provides for a saturating activation function. For a waveguide of length $z_0=1$ cm, with good mode overlap $s\approx 1$, in lithium niobate with $\chi^{(2)}=31$ pm/V, $\epsilon_s=160$ kV/m. Such a field strength amplitude corresponds to a peak power of approximately $$\varepsilon_0\sqrt{\eta}\, c\epsilon_s^2 a = 20\ \mu W$$

for a waveguide with a cross-sectional area of $a=0.2\ \mu m^2$. Depending on the platform, especially to avoid heterogenous integration, other materials with a high $\chi^{(2)}$, such as gallium arsenide, aluminum gallium arsenide, or silicon carbide, can be used instead of lithium niobate. Using materials with both high $\chi^{(2)}$ and $\chi^{(3)}$ coefficients for both the microring resonators and the nonlinearity would allow the entire device to be integrated into a single material platform.

An alternative nonlinear activation function for an inventive optical neural network uses a second-harmonic mode to interact with the neuron modes instead of a subharmonic mode (i.e., a mode at twice the frequency of the neuron mode instead of half the frequency of the neuron mode). Using a second-harmonic mode instead of a subharmonic mode alleviates constraints on the material transparency and the availability of high efficiency sources at subharmonic frequencies. The interaction of the neuron modes with second-harmonic pumps can be modelled by the same system of partial differential equations, in which the neuron and pump modes are permuted:

$$\frac{\partial E_{sec}}{\partial z} + \frac{\eta}{c}\frac{\partial E_{sec}}{\partial t} = -\kappa E_n^2 - \alpha E_{sec}$$

$$\frac{\partial E_n}{\partial z} + \frac{\eta}{c}\frac{\partial E_n}{\partial t} = -\kappa E_{sec} - \alpha E_n$$

where $E_n$ is the neuron mode and $E_{sec}$ is the second harmonic pump mode. These nonlinear activation functions can be used in order to amplify the neuron modes and circumvent losses.

The nonlinear activation function can also be used to circumvent losses experienced in the ring resonators. The nonlinear interaction can be engineered to provide an activation function with a slope greater than one, instead of a sigmoid-like function.

Image Classification With an Inventive Optical Neural Network

Figure 9A:
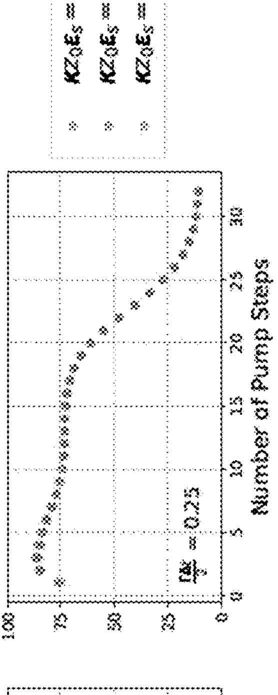
FIG. 9A shows plots of classification accuracy versus number of pump steps for a simulated optical neural network at different decay rates.
Figure 9A:
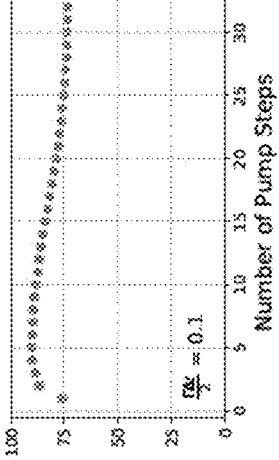
Figure 9A:
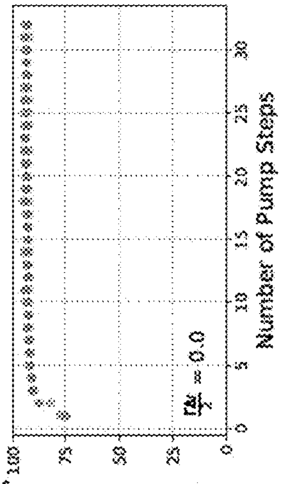
Figure 9A:
Figure 9B:
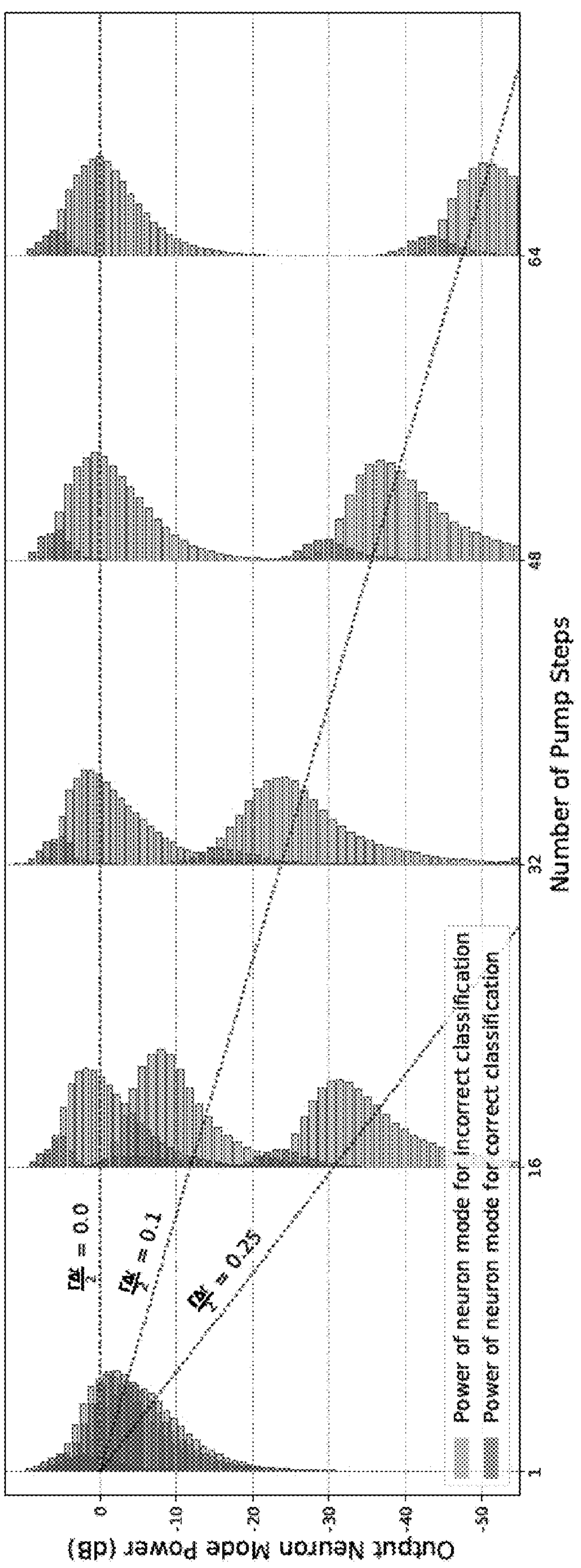
FIG. 9B shows histograms of the power carried by the output neuron modes for the simulated optical neural network of FIG. 9A.

FIGS. 9A and 9B illustrate the classification performance of a simulated all-optical neural network against the MNIST dataset of handwritten digits for different depending on optical losses, effective waveguide nonlinearity, and network size. The optical neural network included varying numbers of 64-neuron sublayers (as depicted on the horizontal axis) followed by ten 10-neuron layers.

The optical neural network was trained on the low-frequency Fourier features of 50,000 28×28-pixel images from the MNIST dataset. The training images were pre-processed by truncating the central N×N window from the two-dimensional Fourier transform of the images. These bitmaps were then reshaped into vectors of size $N^2$. These vectors are encoded into the initial complex amplitudes of the modes of the simulated microring resonator, i.e., the input layer of the neural network. We chose N=8 as the low-frequency components contained most of the pertinent information about the images. Our training used mini-batch gradient descent for 200 epochs with the Adam optimizer. Each batch contained 2000 training images. The learning rate decayed exponentially, from 0.01 at the start to 0.0002 at the end.

The simulated optical neural network implemented linear transformations through active coupling. These simulations tested the performance of the simulated optical neural network in different loss regimes with varying number of sub-layers, i.e., the piece-wise constant steps of the pumps. Expressivity grew with the number of sub-layers until losses due to the prolonged operations become detrimental.

FIG. 9A shows the simulated optical neural network's classification accuracy (vertical axis) versus the number of sub-layers, i.e., distinct piece-wise constant steps in the control pumps (horizontal axis). The three top facets depict different decay rates Γ, e.g., $\Gamma\Delta t/2=0.25$ corresponds to $\Gamma=0.5\ ns^{-1}$ for a step duration of $\Delta t=1$ ns. Different markers represent different strengths of the nonlinear interaction in the waveguides between ring-resonators. Increasing the number of sub-layers improves the performance thanks to the higher expressivity of the encoded operation, further increase causes non-unitary behavior and decrease in expressivity. The righthand facet shows a precipitous drop in performance when, due to the increasing losses, the shot noise starts dominating the measurement result.

FIG. 9B shows histograms of the power carried by the output neuron modes. For various number of sub-layers (horizontal axis) and various loss rates (annotated with dashed lines), the plot shows the distribution of energy per neuron mode (histograms with respect to the vertical axis). The taller histograms correspond to the incorrect class neurons, while the shorter histograms are the correct class neurons (which are fewer in number). The energy carried by the correct class neurons is consistently higher, indicating effective classification. Moreover, at high expressivity the correct class histogram has noticeably smaller spread. The zero dB reference corresponds to a maximum of $10^6$ photons per mode.

FIG. 9A confirms that some minimum number of sub-layers yields sufficiently good accuracy and that accuracy degrades due to losses at higher numbers of sub-layers. FIG. 9B explicitly illustrates this loss regime, with the histograms showing the energy carried by each neuron mode at the output of the neural network. The energy of the neurons decays exponentially as the number of sub-layers increases. Even before measurements become shot-noise limited, the performance of the network drops. A state-of-the art cavity ($\Gamma$=0.2 $ns^{-1}$) and control pulse resolution of $\Delta t$=1 ns yields excellent classification performance and less than 5 dB of loss. However, for larger networks, the pumping schemes discussed above improve the optical neural network's reliability.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical neural network comprising:

a multimode optical cavity to support optical neuron modes representing respective neurons in a layer of the optical neural network;

a pump source, in optical communication with the multimode optical cavity, to couple pump modes into the multimode optical cavity, the pump modes encoding respective weights of the layer of the optical neural network, the optical neuron modes undergoing a linear transformation via a nonlinear mixing process with the pump modes in the multimode optical cavity; and a nonlinear optical medium, in optical communication with the multimode optical cavity, to perform a nonlinear transformation on an output of the multimode optical cavity.

2. The optical neural network of claim 1, wherein the multimode optical cavity comprises a multimode ring resonator formed at least in part of a third-order nonlinear medium.

3. The optical neural network of claim 1, wherein the multimode optical cavity is a first multimode optical cavity in a series of cascaded multimode optical cavities.

4. The optical neural network of claim 1, wherein the nonlinear mixing process is a four-wave mixing process between the optical neuron modes and the pump modes.

5. The optical neural network of claim 1, wherein the nonlinear optical medium comprises a second-order nonlinear medium.

6. The optical neural network of claim 1, wherein the nonlinear transformation is a second-order nonlinear interaction between the optical neuron modes and subharmonic pump modes.

7. The optical neural network of claim 1, further comprising:

a tunable coupler, in optical communication with the multimode optical cavity, to selectively couple the optical neuron modes into and out of the multimode optical cavity.

8. The optical neural network of claim 1, further comprising:

a dispersive waveguide segment, in optical communication with an input to the nonlinear optical medium, to temporally disperse the optical neuron modes before the nonlinear transformation.

9. The optical neural network of claim 8, further comprising:

a dispersion-compensating waveguide segment, in optical communication with an output of the nonlinear optical medium, to temporally align the optical neuron modes after the nonlinear transformation.

10. A method of implementing an optical neural network, the method comprising:

coupling optical neuron modes into a multimode optical cavity, the optical neuron modes having complex amplitudes representing respective inputs to a layer of the optical neural network;

coupling pump modes representing weights of the layer of the optical neural network into the multimode optical cavity, the pump modes mediating a linear transformation of the optical neuron modes in the multimode optical cavity via a nonlinear mixing process;

coupling the optical neuron modes from the multimode optical cavity to a nonlinear optical medium; and nonlinearly transforming the optical neuron modes in the nonlinear optical medium to produce outputs of the layer of the optical neural network.

11. The method of claim 10, wherein coupling the optical neuron modes into the multimode optical cavity comprises tuning a coupling coefficient between an optical waveguide guiding the optical neuron modes and the multimode optical cavity.

12. The method of claim 11, wherein coupling the optical neuron modes from the multimode optical cavity into the nonlinear optical medium comprises tuning the coupling coefficient between the optical waveguide and the multimode optical cavity.

13. The method of claim 10, wherein linearly transforming the optical neuron modes comprises four-wave mixing between the optical neuron modes and the pump modes.

14. The method of claim 10, wherein nonlinearly transforming the optical neuron modes comprises performing an elementwise sigmoid transformation on the optical neuron modes.

15. The method of claim 10, wherein nonlinearly transforming the optical neuron modes comprises coupling subharmonic modes into the nonlinear optical medium with the optical neuron modes so as to initiate a second-order nonlinear interaction between the optical neuron modes and the subharmonic modes.

16. The method of claim 10, further comprising:

temporally dispersing the optical neuron modes before nonlinearly transforming the optical neuron modes.

17. The method of claim 16, further comprising:

temporally aligning the optical neuron modes after nonlinearly transforming the optical neuron modes.

18. The method of claim 10, further comprising:

preserving temporal envelopes of the optical neuron modes during the linear transformation.

19. An optical neural network comprising:

a plurality of neural network layers, each neural network layer in the plurality of neural network layers comprising:

a multimode microring resonator supporting optical pump modes representing weights of the neural network layer and optical neurons modes having complex amplitudes representing respective neurons of the neural network layer, the multimode microring resonator comprising a third-order nonlinear medium to support four-wave mixing of the optical pump modes with the optical neurons modes;

a dispersive waveguide segment, in optical communication with the multimode microring resonator, to temporally disperse an output of the multimode microring resonator; and a second-order nonlinear medium, in optical communication with the multimode microring resonator, to support an elementwise nonlinear transformation of the output of the multimode microring resonator.

20. The optical neural network of claim 19, wherein each neural network layer further comprises:

a tunable coupler, in optical communication with the multimode microring resonator, to selectively couple the optical neuron modes into and out of the multimode microring resonator.

* * * * *